United States Patent [19]

Shudo et al.

[11] Patent Number: 4,761,694
[45] Date of Patent: Aug. 2, 1988

[54] APPARATUS FOR RECORDING/REPRODUCING A COMPOSITE VIDEO SIGNAL WITH A ROTARY RECORDING MEDIUM AND CIRCUIT ARRANGEMENT THEREFOR

[75] Inventors: Katsuyuki Shudo; Hisao Kinjo; Keigo Okano; Yoshiaki Hanashiro, all of Yokohama, Japan

[73] Assignee: Victor Company of Japan, Ltd., Yokohama, Japan

[21] Appl. No.: 706,794

[22] Filed: Feb. 28, 1985

[30] Foreign Application Priority Data

Mar. 1, 1984 [JP] Japan .................................. 59-39468

[51] Int. Cl.⁴ ........................ H04N 5/78; H04N 9/491
[52] U.S. Cl. ................................. 360/37.1; 360/10.1; 360/35.1; 358/312
[58] Field of Search ................ 360/10.1, 35.1, 37.1; 358/312, 335, 340, 906

[56] References Cited

U.S. PATENT DOCUMENTS

| 3,134,853 | 5/1964 | Okamura. | |
|---|---|---|---|
| 3,898,376 | 8/1975 | Nabeyama et al. | 360/10.1 X |
| 3,947,870 | 3/1976 | Yumde et al. | 358/312 |
| 4,058,840 | 11/1977 | Kasprzak | 360/10.1 |
| 4,142,209 | 2/1979 | Hedlund et al. | 358/342 |
| 4,233,621 | 11/1980 | Yamagiwa et al. | |
| 4,419,698 | 12/1983 | Shiraishi et al. | |
| 4,470,076 | 9/1984 | Ovai et al. | 358/312 |
| 4,481,543 | 11/1984 | Saito | 360/10.1 |
| 4,567,535 | 1/1986 | Kinjo | 358/906 X |
| 4,604,667 | 8/1986 | Kinjo. | |

FOREIGN PATENT DOCUMENTS 1120091 3/1982 Canada .
0024850 3/1981 European Pat. Off. .
3302211 7/1984 Fed. Rep. of Germany .
2409649 6/1979 France .
2419632 10/1979 France .
52-152712 12/1977 Japan .
58-73072 5/1983 Japan .
58-210775 12/1983 Japan .
59-204389 11/1984 Japan .
59-213068 12/1984 Japan .

Primary Examiner—Aristotelis M. Psitos
Attorney, Agent, or Firm—Lowe, Price, LeBlanc, Becker & Shur

[57] ABSTRACT

In apparatus for recording/reproducing a composite video signal on and from a rotary recording medium (1), the field of the composite video signal is detected and only odd or even field signal is delayed by one half (H/2) a horizontal scanning period so that the composite video signal is changed to a modified composite video signal which is recorded on the rotary recording medium (1) together with a field distinguishing signal (Sf) produced using the result of the field detection. The field distinguishing signal (Sf) is arranged to be located at a given time position with respect to a predetermined vertical sync signal of every one frame period of the recording signal on a rotary recording medium (1) driven and rotated at a rotational period equal to the vertical scanning period of the composite video signal. This field distinguishing signal is extracted from a reproduced signal obtained in reproduce mode so that field switching is effected using the reproduced field distinguishing signal thereby delaying only even or odd field signal, which has not been delayed on recording, for obtaining a composite video signal having sync signals which with regular interlaced scanning can be performed.

13 Claims, 9 Drawing Sheets

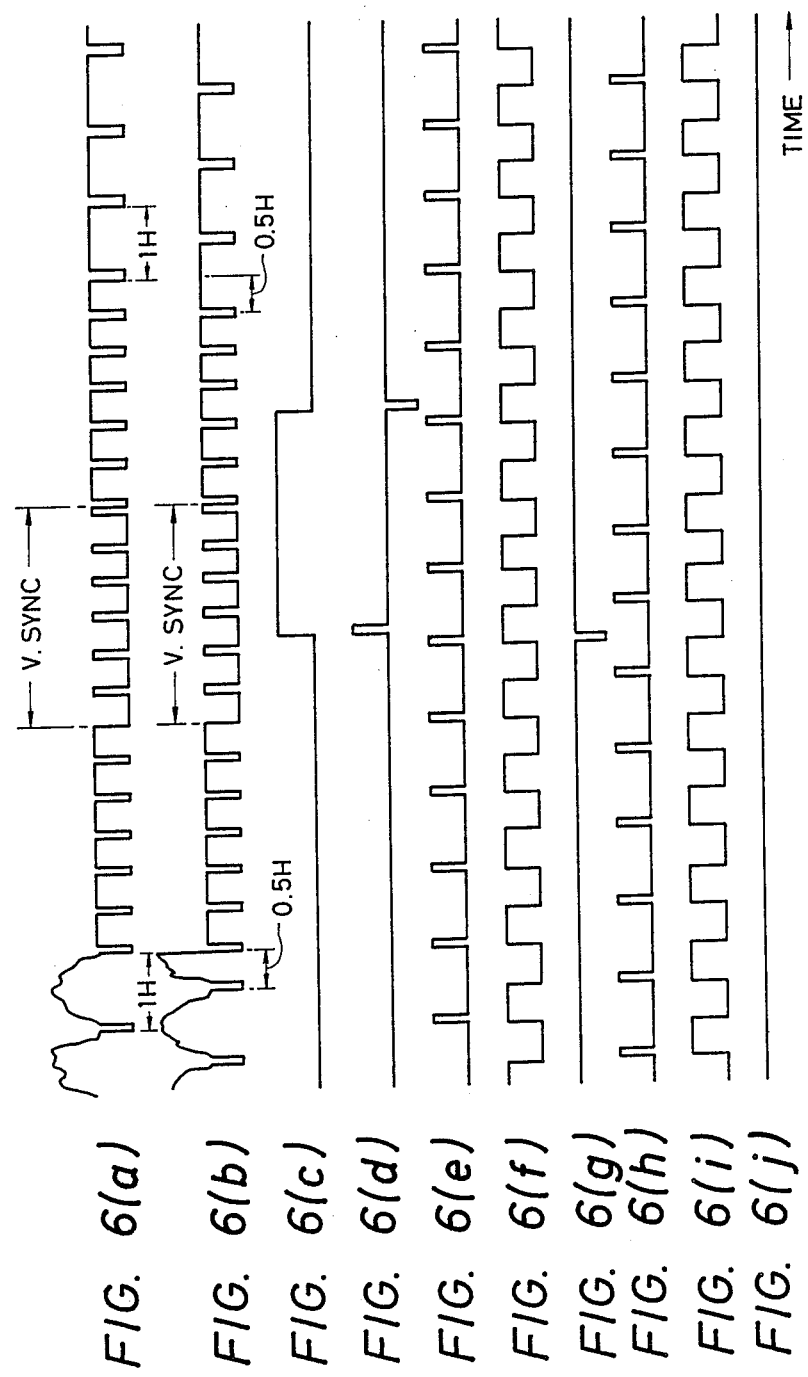

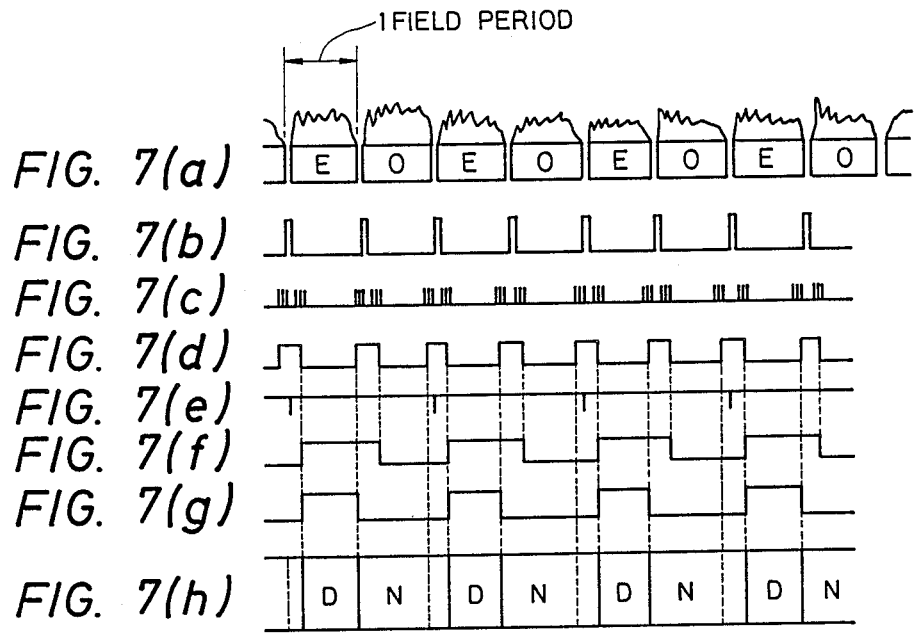
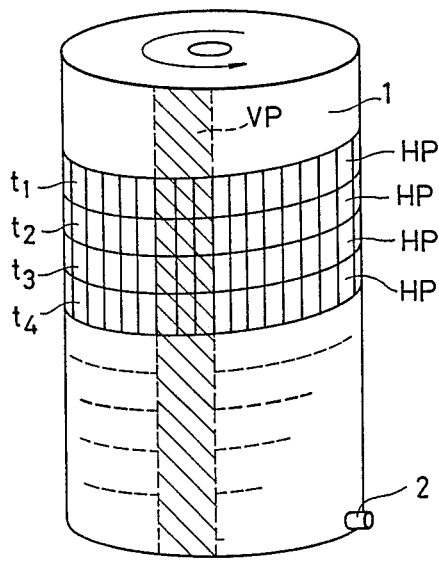
FIG. 8(a)
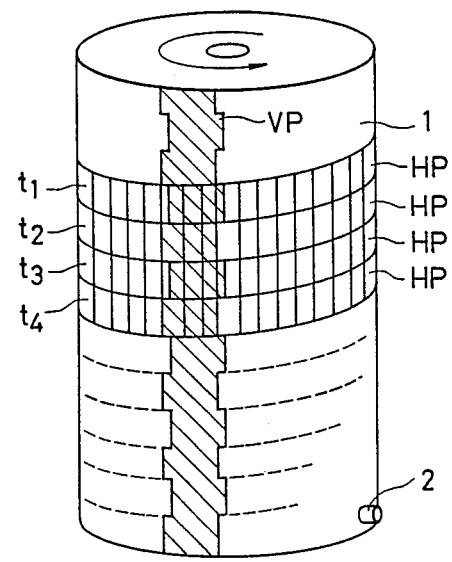
FIG. 8(b)

APPARATUS FOR RECORDING/REPRODUCING A COMPOSITE VIDEO SIGNAL WITH A ROTARY RECORDING MEDIUM AND CIRCUIT ARRANGEMENT THEREFOR

BACKGROUND OF THE INVENTION

The present invention relates generally to apparatus for recording and reproducing a video signal, and more particularly to apparatus for recording and reproducing a composite video signal on and from a rotary recording medium, such as a cylindrical or disc-like magnetic recording medium. More specifically, the invention relates to apparatus for recording/reproducing a composite video signal arranged to record and reproduce an odd field signal and an even field signal of a composite video signal, which is arranged that horizontal scanning and vertical scanning are performed in accordance with a scanning standard adopting an interlaced scanning whose interlacing ratio is 2 to 1, on a recording surface of a rotary recording medium (a disc-like or cylindrical recording medium) driven and rotated at a period equal to the vertical scanning period of the composite video signal such that the positions of horizontal sync signals in successive adjacent recording tracks are aligned with the recording positions of vertical sync signals in the direction of the width of the recording tracks.

As apparatus for recording and reproducing information signals are known various structures formed in accordance with various recording/reproducing systems using recording media of various forms. Among them apparatus for recording and reproducing information signals using a rotary recording medium arranged to record/reproduce information signals with a disc-like or cylindrical recording medium being rotated is simple in the structure of recording medium driving mechanism and record/reproduce transducer driving mechanism when compared with apparatus for recording and reproducing information signals using a tape-like or sheet-like recording medium. Furthermore, in recording/reproducing apparatus using a rotary recording medium as a recording medium, in the case that the rotary recording medium is of no-groove type or reproduction of inforamtion signals from the rotary recording medium is effected under a condition of noncontact with the rotary recording medium, random access is readily performed when reproducing information signals from the rotary recording medium while trick play by way of special reproduce modes, such as still picture reproduction, slow-motion reproduction, high-speed reproduction, is possible in the case that the information signal is a composite video signal. For these reasons apparatus for recording/reproducing information signals of various recording/reproducing systems (such as magnetic recording/repoducing system, photomagnetic recording/reproducing system, thermomagnetic recording/reproducing system, optical recording/reproducing system, reproducing system of electrostatic capacity variation detection type, mechanical reproducing system, and so on) using a rotary recording medium are widely practically used as is well known. The present applicant company is making a research for the practical use of recording/reproducing apparatus using a rotary recording medium of various record/reproduce system having the above-mentioned various features, and made many proposals relating to, for instance, micro magnetic recording/reproducing apparatus using a cylindrical magnetic recording medium as a micro recording/reproducing system.

Namely, microminiaturization of video tape recorders (VTRs) is recently planned while the microminiaturization of television cameras (television will be referred to as TV hereinafter) using solid imaging devices of various types and integrated circuits is also planned, and furthermore research and development are performed on a large scale on a microminiaturized VTR (so called electronic 8 mm device) integrated with a camera obtained by combining the above-mentioned microminiaturized camera with a microminiaturized VTR. In addition, research and development have been made on so called electronic cameras that record still pictures in place of still cameras using photographic films, and it was announced that an electronic camera of the type of recording a video signal using a micro flexible magnetic disc in place of a photographic film, which has been miniaturized to a degree of a single-lens reflex camera of 35 mm, has reached a stage of practical use.

The present applicant company also proposed, by way of Japanese patent applications No. 56-171868 (patent provisional publication No. 58-73072), No. 58-86946, and others, a micro image taking recording apparatus which is capable of recording in both frame-by-frame taking mode and continously recording mode for a short period of time using a cylindrical magnetic recording medium having a size of a cartridge of 35 mm photograph film. Corresponding applications of the above-mentioned Japanese application No. 56-171868 are U.S. application SN 436,418, British application No. 8230738 and West Germany application No. P32 39 659.7.

Since a relative linear velocity between a magnetic film of a cylindrical magnetic recording medium and a record/reproduce element is constant throughout the peripheral surface of the magnetic recording medium, there is a possibility that an entire peripheral surface can be effectively used as a region for recording and reproducing. In the case that the cylindrical magnetic recording medium has a size similar to a cartridge of 35 mm film (overall length: 47 mm, diameter: 25 mm) or a casing (overall length: 53 mm, diameter: 31 mm) for containing the above-mentioned cartridge, a relative linear velocity substantially equal to the relative linear velocity of 5.8 m/s between the magnetic head and the magnetic tape in a home use VTR of a type which is most popular in the world, is obtained, and therefore, when a cylindrical magnetic recording medium having a diameter of 31 mm and a length of 50 mm is rotated at 3600 rpm (the rotary recording medium is rotated at a rotation period equal to a vertical sync period of a composite video signal to be recorded on the rotary recording medium), and the periphery speed is set to 5.8 m/s for recording a portion corresponding to one field of a TV composite video signal per one revolution, where recording track width is 3 $\mu$m, guard band width is 1.5 $\mu$m, and the distance between tracks (track pitch) is 4.5 $\mu$m, then a large recording capacity can be obtained with a small size such that stationary pictures of 10800 frames can be recorded on the cylindrical recording medium of the above-mentioned shape and size while it is possible to effect continuous recording of a normal composite video signal for three minutes or six minutes recording by adopting a field-skipping system. Furthermore, when a recording medium driving motor is provided at an internal space at the center of the magnetic recording medium, it is possible to miniaturize the magnetic recording/reproducing apparatus which is capable of magnetic recording or magnetic recording/reproducing, and this is advantageous when forming a small-sized and light-weighted image-taking recording apparatus.

When a composite video signal is recorded on a rotary recording medium with the rotary recording medium being rotated at a rotation period equal to the vertical scanning period of the composite video signal as described taking an exampe of the above-mentioned apparatus for recording/reproducing a composte video signal using a cylindrical magnetic recording medium as a rotary recording medium, a portion of one field of the composite video signal is recorded per one revolution of the rotary recording medium thereon. Therefore, when recording the composite video signal on the rotary recording medium under a condition that a recording element is continuously shifted by one recording track pitch per one revolution of the rotary recording medium, then spiral recording tracks are continuously formed on the rotary recording medium. On the other hand, when recording the composite video signal on the rotary recording medium under a condition that the recording element is stationary and the shifting of the recording element by one recording track pitch is of intermittent moving such that it is instantanously effected during vertical blanking signal period, then annular recording tracks are formed on the rotary recording medium.

In order to stably rotating the above-mentioned rotary recording medium at a predetermined rotational period and rotational phase, a rotation control system has hitherto been used so that the rotational period and the rotational phase of a driving motor of the rotary recording medium are controlled using a phase error signal obtained by phase comparison between an output of a sensor which is capable of detecting the rotational period and the rotational phase of the rotary recording medium and a vertical sync signal of the composite video signal which is an objective of recording by the rotary recording medium.

As will be described in detail with reference to accompanying drawings, conventional appartus for recording/reproducing a composite video signal on a rotary recording medium have suffered from various problems, such as the deterioration of picture quality due to crosstalk from adjacent recording tracks, difficulty in automatic tracking, difficulty in the operation of the servo system in a VTR when dubbing is intended, difficulty in frame-by-frame taking and recording and so on.

SUMMARY OF THE INVENTION

The present invention has been developed in order to remove the above-described drawbacks inherent to the conventional apparatus for recording/reproducing a composite video signal on and from a rotary recording medium.

It is, therefore, an object of the present invention to provide a new and useful apparatus for recording/reproducing a composite video signal on and from a rotary recording medium with which apparatus high picture quality is ensured in any specific recording mode including fram-by-frame taking and recording mode, while dubbing by a video tape (cassette) recorder can be satisifactory perofrmed.

According to a feature of the present invention in apparatus for recording/reproducing a composite video signal on and from a rotary recording medium, the field of the composite video signal is detected and only odd or even field signal is delayed by one half a horizontal scanning period so that the composite video signal is changed to a modified composite video signal which is recorded on the rotary recording medium together with a field distinguishing signal produced using the result of the field detection. The field distinguishing signal is arranged to be located at a given time position with respect to a predetermined vertical sync signal of every one frame period of the recording signal on a rotary recording medium driven and rotated at a rotational period equal to the vertical scanning period of the composite video signal. This field distinguishing signal is extracted from a reproduced signal obtained in reproduce mode so that field switching is effected using the reproduced field distinguishing siganl thereby delaying only even or odd field signal, which has not been delayed on recording, for obtaining a composite video signal having sync signals which with regular interlaced scanning can be performed.

In accordance with the present invention there is provided a circuit arrangement for use with apparatus for recording and/or reproducing a composite video signal according to a standard television system with interlaced scanning on and/or from a rotary recording medium, said circuit arrangement comprising: first means responsive to horizontal and vertical sync signals of an input composite video signal to be recorded on said rotary recording medium or horizontal and vertical sync signals synchronized with said horizontal and vertical sync signals for determining whether a present field is an odd field or an even field and producing an output signal indicative of the kind of detected field; second means responsive to said horizontal sync signal and to said output signal from said first means for producing a first control signal for a period of time corresponding to said odd or even field; third means for delaying, by a period equal to one half a horizontal scanning period, only odd or even field signal of said input composite video signal except for a portion around its vertical sync signal in the presence of said first control signal from said second means, thereby producing a modified composite video signal to be recorded on said rotary recording medium; a record circuit responsive to said modified composite video signal for converting same into a signal suitable for recording; fourth means responsive to said horizontal sync signal and to said output signal from said first means for producing a field distinguishing signal indicative of either odd field or even field; and fifth means for mixing said field distinguishing signal with said signal from said record circuit so that a superposed signal is fed to a record head.

In accordance with the present invention there is also provided a circuit arrangement for use with apparatus for recording/reproducing a composite video signal according to a standard television system with interlaced scanning on and from a rotary recording medium, said circuit arrangement comprising: first means responsive to horizontal and vertical sync signals of an input composite video signal to be recorded on said rotary recording medium or horizontal and vertical sync signals synchronized with said horizontal and vertical sync signals for determining whether a present field is an odd field or an even field and producing an output signal indicative of the kind of detected field; second means responsive to said horizontal sync signal and to said output signal from said first means for producing a first control signal for a period of time corresponding to said odd or even field; third means for delaying, by a period equal to one half a horizontal scanning period, only odd or even field signal of said input composite video signal except for a portion around its vertical sync signal in the presence of said first control signal from said second means, thereby producing a modified composite video signal to be recorded on said rotary recording medium; a record circuit responsive to said modified composite video signal for converting same into a signal suitable for recording; fourth means responsive to said horizontal sync signal and to said output signal from said first means for producing a field distinguishing signal indicative of either odd field or even field; fifth means for mixing said field distinguishing signal with said signal from said record circuit so that a superposed signal is fed to a record head; a reproduce circuit responsive to a reproduced signal from a reproduce head for obtaining a reproduced modified composite video signal which is then fed to said third means; a detecting circuit responsive to said reproduced signal from said reproduce head for detecting said field distinguishing signal; sixth means responsive to said detecting circuit for producing a second control signal for a predetermined period of time substantially corresponding to even or odd field, said second control signal being fed to said third means in place of said first control signal in reproduce mode where said reproduced modified composited video signal from said reproduce circuit is fed to said third means in place of said input composite video signal so that only even or odd field signal, which has not been delayed on recording, is delayed by one half the horizontal scanning period, thereby restoring to said input composite video signal.

In accordance with the present invention there is also provided apparatus for recording/reproducing a composite video signal according to a standard television system with interlaced scanning on and from a rotary recording medium, said apparatus comprising: rotary recording medium driving means for rotating the same at a speed equal to vertical scanning period of said composite video signal; a head for recording/reproducing said composite video signal on and from said rotary recording medium; a head shifting mechanism for moving said head in synchronism with said vertical sanning period; first means responsive to horizontal and vertical sync signals of an input composite video signal to be recorded on said rotary recording medium or horizontal and vertical sync signals synchronized with said horizontal and vertical sync signals for determining whether a present field is an odd field or an even field and producing an output signal indicative of the kind of detected field; second means responsive to said horizontal sync signal and to said output signal from said first means for producing a first control signal for a period of time corresponding to said odd or even field; third means for delaying, by a period equal to one half a horizontal scanning period, only odd or even field signal of said input composite video signal except for a portion around its vertical sync signal in the presence of said first control signal from said second means, thereby producing a modified composite video signal to be recorded on said rotary recording medium; a record circuit responsive to said modified composite video signal for converting same into a signal suitable for recording; fourth means responsive to said horizontal sync signal and to said output signal from said first means for producing a field distinguishing signal indicative of either odd field or even field; fifth means for mixing said field distinguishing signal with said signal from said record circuit so that a superposed signal is fed to said head; a reproduce circuit responsive to a reproduced signal from said head for obtaining a reproduced modified composite video signal which is then fed to said third means; a detecting circuit resonsive to said reproduced signal from said reproduce head for detecting said field distinguishing signal; a sixth means responsive to said detecting circuit for producing a second control signal for a predetermined period of time substantially corresponding to even or odd field, said second control signal being fed to said third means in place of said first control signal in reproduce mode where said reproduced modified composited video signal from said reproduce circuit is fed to said third means in place of said input composite video signal so that only even or odd field signal, which has not been delayed on recording, is delayed by one half the horizontal scanning period, thereby restoring to said input composite video signal.

In accordance with the present invention there is further provided apparatus for recording a composite video signal comprising: means for producing a recording signal having a signal form suitable for recording and reproducing on the basis of a modified composite video signal arranged such that a signal other than a portion around a vertical sync signal of one of odd field signal and an even field signal of a composite video signal which is an objective of recording and reproducing where horizontal scanning and vertical scanning are performed in accordance with a scanning standard adopting interlaced scanning, is delayed by $\frac{1}{2}$ of a horizontal synchronous period relative to the composite video signal of the other field; and means for recording a recording signal produced on the basis of said modified composite video signal and a field distinguishing signal located at a given time position with respect to a predetermined vertical sync signal of each frame in said recording signal onto a rotary recording medium which is rotated at a rotating period equal to the period of vertical scanning of the composite video signal.

In accordance with the present invention there is still further provided apparatus for recording/reproducing a composite video signal comprising: means for producing a recording signal having a signal form suitable for recording and reproducing on the basis of a modified composite video signal arranged such that a signal other than a portion around a vertical sync signal of one of odd field signal and an even field signal of a composite video signal which is an objective of recording and reproducing where horizontal scanning and vertical scanning are performed in accordance with a scanning standard adopting interlaced scanning, is delayed by $\frac{1}{2}$ of a horizontal sync period relative to the composite video signal of the other field; means for recording a recording signal produced on the basis of said modified composite video signal and a field distinguishing signal located at a given time position with respect to a predetermined vertical sync signal of each frame in said recording signal onto a rotary recording medium which is rotated at a rotating period equal to the period of vertical scanning of the composite video signal; means for reproducing a reproducing signal corresponding to the recording signal produced on the basis of said modified composite video signal from said rotary recording medium and a reproducing signal corresponding to said field distinguishing signal; and means for obtaining modified composite video signal and field distinguishing signal from said reproducing signal; and means for obtaining the original composive video signal by retarding the field signal, which is not delayed, of the modified composite video signal using the field distinguishing signal by a period of ½ of the horizontal sync signal.

BRIEF DESCRIPTION OF THE DRAWINGS

The object and features of the present invention will become more readily apparent from the following detailed description of the preferred embodiments taken in conjunction with the accompanying drawings in which:

FIGS. 6(a)–6(j) and 7 (a)–7(h) 10(a)–10(n) 11(a)–11(h) are signal waveform charts;

FIGS. 8(a) and 8(b) show plan views of recording track patterns recorded by apparatus according to applicant's earilier invention and by the apparatus for recording/reproducing a composite video signal according to the present invention;

The same or corresponding elements and parts are designated at like reference numerals throughout the drawings.

DETAILED DESCRIPTION OF THE INVENTION

Prior to describing a preferred embodiment of the present invention, some conventional apparatus and apparatus devised by the present inventors prior to the present invention will be described for a better understanding of the present invention.

Figure 1:
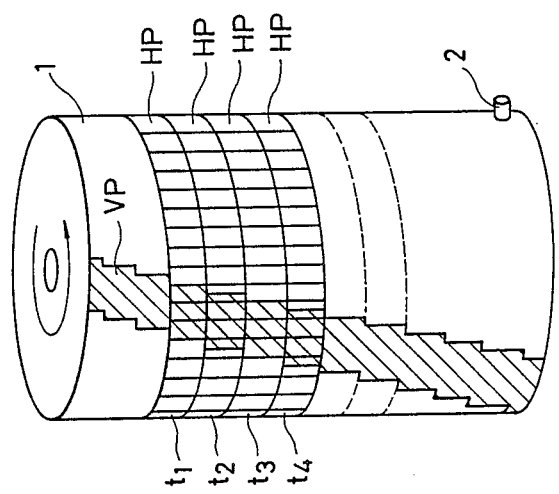
FIGS. 1 and 2 are plan views schematically showing recording track patterns recorded by a conventional apparatus.

A recording track pattern on a recording surface of the rotary recording medium arranged such that a signal of each one of successive fields of a composite video signal is recorded per one revolution of the rotary recording medium by being controlled by the above-mentioned rotation control system, is such that the recording position of a horizontal sync signal on adjacent recording tracks on the rotary recording medium is relatively deviated, as shown in FIG. 1, by ½ of one horizontal scanning period (which may be referred to as 1H period hereinafter) in a direction of the extension of the recording tracks (although FIG. 1 shows an example of cylindrical recording medium as the rotary recording medium, the fact that the recording position of a horizontal sync signal on adjacent recording tracks on the rotary recording medium is relatively deviated by ½ of one horizontal scanning period in a direction of the extension of the recording tracks is the same in the case of a disc-like recording medium) when the composite video signal, which is an objective of recording on the rotary recording medium, is arranged such that horizontal scanning and vertical scanning are performed in accordance with a scanning standard adopting interlaced scanning of an interlacing ratio of 2 to 1.

More specifically, in FIG. 1, tracks t1, t2, t3 ... corresponding to every field signals of a composite video signal are formed to be arranged in a sequence in a direction of an axial line (generatrix) on the recording surface, i.e. the peripheral surface of the rotary recording medium 1 each time the rotary recording medium 1 makes a full turn, and in the successive recording tracks which are adjacent to each other, the recording position of horizontal sync signals are deviated by H/2 in back and forth directions between adacent recording tracks as shown by vertical solid lines HP in the drawing. In the following description, it is assumed that the cylindrical rotary recording medium 1 is a cylindrial magnetic recording medium 1, and a recording surface at the peripheral surface thereof is formed by a magnetic film. The magnetic film of the cylindrical magnetic recording medium 1 may be formed on either the outer surface of the cylindrical magnetic recording medium 1 or the inner surface of the cylindrical magnetic recording medium 1.

On the other hand the recording position of the vertical sync signal is, as shown by oblique lines VP in FIG. 1, in a state that they are aligned in a direction of the width of recording tracks with respect to adjacent recording tracks. In FIG. 1, the reference 2 is a magnet piece secured to an end of the cylindrical magnetic recording medium 1, and this magnetic piece 2 forms a sensor for the detection of rotational period and rotational phase of the magnetic recording medium 1 by way of a combination with a Hall element or magnetic detecting element such as a magnetic head.

Figure 9:
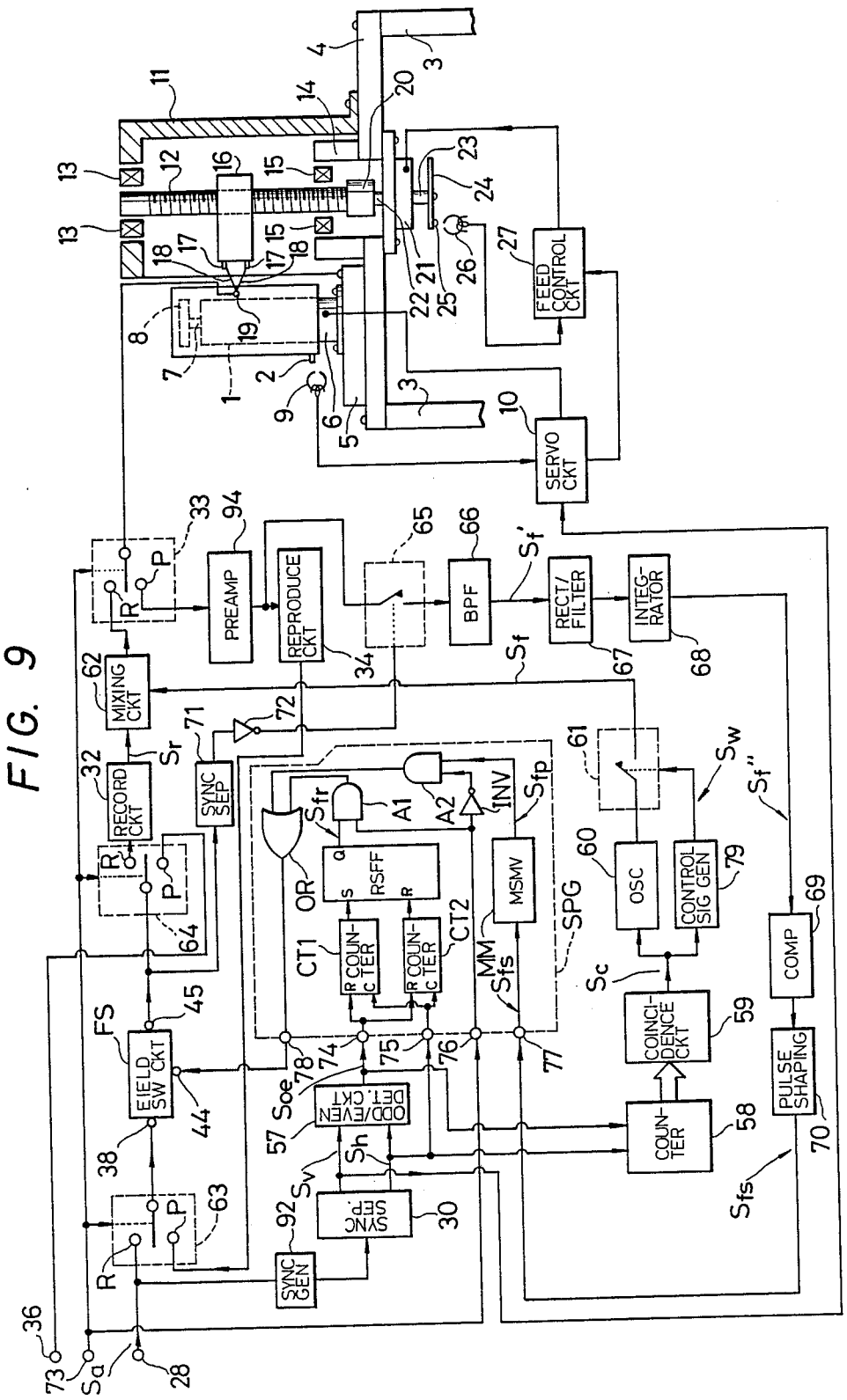
FIG. 9 is a block diagram of an embodiment of the apparatus for recording/reproducing a composite video signal according to the present invention.

In FIG. 1 and FIGS. 8 and 9, which will be described hereinlater, the recording positions HP of horizontal sync signal are shown in connection with only four recording tracks for simplicity, whereas the recording position VP of the vertical sync signal is shown throughout an entire recording region of the cylindrical magnetic recording medium 1 for convenience of description.

In the case of reproducing information signals recorded on the cylindrical magnetic recording medium 1 having a recording track pattern such as shown in FIG. 1, if there occurs corsstalk from an adjacent recoring track, a reproduced picture obtained in accordance with a reproduced signal would suffer from deterioration in picture quality.

As shown in FIG. 1, the video signal in adjacent recording tracks where the recording positions of the horizontal sync signals of the adjacent recording tracks are deviated by H/2 from each other, have information contents which substantially have no line correlation and field correlation, and therefore, the frequency of a reproduced FM carrier of a reproduced signal based on a recording signal (FM composite video signal) recorded on a recording track which is an objective of reproduction, and a frequency of a reproduced FM carrier of a reproduced signal based on a recording signal (FM composite video signal) recorded on an adjacent recording track which recording signal appears in the reproduced signal by crosstalking from the adjacent recording track interfere with each other by repeating approach and alianation in accordance with the change in information contents. As a result, beat components of various frequencies are mixed to cause the occurrence of a dirty stripe pattern in the reproduced picture, deteriorating the picture quality to a considerable extent.

In magnetic recording/reproducing apparatus for recording/reproducing a video signal such that a head attached to a rotary body scans the surface of a recording medium which moves relatively in a given direction, as the present applicant proposed in Japanese patent application No. 51-69271 (Patent Provisional Publication No. 52-152712), when applying to a magnetic recording/reproducing apparatus comprising means for driving the moving the head on reproduction in a direction substantially normal to the scanning direction of the recording tracks formed on the recording medium by the above-mentioned head, means for recording a tracking reference signal during blanking period of respective given horizontal scanning periods of the video signal to be reorded such that the tracking reference signals are located at different positiones before and behind in a direction of the scanning direction of the recording tracks; means for converting into tracking driving control power by comparing a tracking reference signal which is reproduced, together with the above-mentioned video signal, from a recording track adjacent to a recording track substantially scanned by a single head on reproducing; and means for applying the above-mentioned driving control power to the above-mentioned head moving and driving means, then in the case of the cylindrical magnetic recording medium 1 having a recording track pattern as shown in FIG. 1, the tracking reference signal reproduced as crosstalk appears at the center of a horizontal scanning period of the reproduced composite video signal from a recording track made as an objective of reproduction, and therefore, an interference signal with an FM composite video signal is mixed in the tracking reference signal, resulting in a problem that automatic tracking cannot be performed accurately.

The above-mentioned problem may be resolved when it is arranged that the recording positions of the horizontal sync signals in adjacent recording tracks in the recording tracks formed on the recording medium are aligned in a direction (a direction substantially normal to the extention of the recording tracks ) of the width of the recording tracks.

In order to effect recording under a condition that the recording positions of the horizontal sync signals in adjacent recording tracks in the recording tracks formed on the recording medium are aligned in a direction (a direction substantially normal to the extention of the recording tracks) of the width of the recording tracks, a recording method was proposed, in Japanese patent provisional publication No. 58-210775 published on June 2, 1982, that the period of the horizontal sync signal of an input composite video signal is frequency divided by an integer so as to be substantially equal to the period of vertical scanning period (for instance, in the case of NTSC system, frequency division ratio is set to either 1/262 or 1/263), and the frequency divided signal is then used as a quasi vertical sync signal to cause a motor driving the cylindrical magnetic recording medium 1 to rotate in synchronism therewith so as to record the composite video signal.

Figure 2:
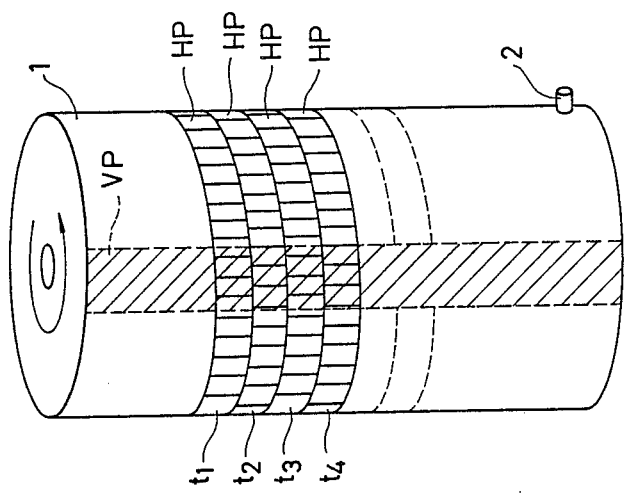

When a composite video signal is recorded on the cylindrical magnetic recording medium 1 by way of the above-mentioned already proposed recording method, a recording track pattern to be formed on the cylindrical magnetic recording medium 1 is, for instance, as shown in FIG. 2, in a condition that the recording positions PH of the horizontal sync signal of successive recording tracks tl, t2, t3 . . . are aligned in line in the axial direction of the cylindrical magnetic recording medium 1 (the direction of generatrix of the cylindrical magnetic recording medium 1), namely in a direction of the width of recording tracks.

However, in this case, the recording positions of the vertial sync signals are shifted by H/2 per one revolution of the cylindrical magnetic recording medium 1 as shown by hatching VP in FIG. 2 for instance (FIG. 2 shows an example where the period of the quasi vertical sync signal is set to a value obtained by frequency dividing the period of the horizontal sync signal to 1/262, and in this case, since the rotating period of the cylindrical magnetic recording medium 1 is shorter than original vertical scanning period of the composite video signal by H/2, the recording positions of the vertical sync signal are shifted by H/2 per one revolution of the cylindrical magnetic recording medium 1 as shown by hatching VP in FIG. 2).

In this way according to the already proposed recording method, since the recording positions of the horizontal sync signal in adjacent recording tracks are in alinged condition, the information contents of the adjacent recording tracks have satisfactory line correlation and field correlation, and therefore, the frequency of the reproduced FM carrier of the reproduced signal based on the recording signal (FM composite video signal) crosstalked from an adjacent recording track assume a value very close to the frequency of the reproduced FM carrier of the reproduced signal based on the recording signal (FM composite video signal) recorded in a recording track which is an objective of reproduction, and therefore, beat frequency substantially assumes zero frequency even if there is a crosstalk betwen adjacent recording tracks.

Since an FM video circuit hardly passes a zero frequency, the above-mentioned beat components are greately suppressed to minimize the deterioration of reproduced pictures. Furthermore, in the case that the tracking reference signal recorded within a horizontal blanking period in a superposed manner is reproduced as a result of crosstalk from an adjacent recording track, since the crosstalk component also appears within the horizontal blanking period, no interference between the crosstalk component and the FM video signal component within the video period is resulted while a component occurred as the result of interference between the crosstalk component from the adjacent recording track and the FM video signal component of the horizontal blanking period has a substantially fixed frequency. In addition, since an interference frequency (beat frequency) component occurred as the result of interference between the crosstalk component from the adjacent recording track and the FM video signal component of the horizontal blanking period can be readily extracted and detected by way of a pulse having horizontal scanning period, it is possible to perform automatic tracking satisfactorily even if a tracking control system arranged to perform tracking control operation using a tracking reference signal reproduced as crosstalk, is adopted.

However, troubles occur when the composite video signal recorded on the cylindrical magnetic recording medium in accordance with the already proposed recording method which has been described with reference to FIG. 2, is again recorded by a VTR such that a signal obtained by reproduction of still picture reproduction mode or other trick play mode is dubbed, or in the case of frame-by-frame recording performed in accordance with the proposed recording method described with reference to FIG. 2.

Namely, still picture reproduction is carried out by repeatedly scanning an arbitrary recording track formed per one revolution of the cylindrical magnetic recording medium 1, a still picture reproduction in the case that the recording track made on the cylindrical magnetic recording medium 1 is spirally continuous is performed by repeating the reproduction operation such that the magnetic head which has scanned a recording track for one revoultion of the cylindrical magnetic recording medium 1, returned instantaneously within the vertical blanking period to the former recording track, in the case that the state of recording on the cylindrical magnetic recording medium 1 is of the case described with reference to FIG. 2, the horizontal scanning phase of the reproduced signal becomes discontinuous by H/2 around the instantaneous changing point between recording tracks which change is made each one revolution of the cylindrical magnetic recording medium 1, and in the case of using 1/262 frequency division servo, a period of one field of a reproduced picture is shorter than a period of one field of a composite video signal based on a standard system by H/2. Therefore, when it is intended to record again the reproduced still picture signal by a VTR to perform dubbing, the servo of the VTR is difficult to operate to raise a problem in recording. Similarly, when performing frame-by-frame recording in accordance with the already proposed recording method described with reference to FIG. 2, the phase of the vertical sync signal of the composite video signal which is an objective of recording differs from the rotational phase of the cylindrical magnetic recording medium 1 momentarily, and therefore, the phase of the vertical sync signals of respective recording tracks are in a random state based on a random recording timing, and thus when it is intended to reproduce by connecting respective recording tracks to each other on reproduction, since the composite video signal of the vertical sync signal recorded with random phases at the time of changing recording tracks, there occurs a problem that a reproduced picture suffers from disturbance, and it has been desired to solve such problems.

The present applicant company has been continuously researching to provide apparatus for recording/reproducing a composite video signal suffering no such problems, and some of the present inventors have already invented recording/reproducing apparatus prior to the present invention. The recording/reproducing apparatus is described in a Japanese Patent application No. 59-204389 filed May 7, 1983, and its brief structure of signal recording/reproducing system and a recording/reproducing mechanism of a cylindrical magnetic recording medium are shown in a block diagram of FIG. 3. This apparatus is arranged to record the composite video signal, in which horizontal scanning and vertical scanning are performed in accordance with a predetermined scanning standard, by performing field processing for substantially switching between delay and nondelay alternately per field using a H/2 delay circuit of H/2 so that mutual phase between the vertical sync signal and the horizontal sync signal becomes always constant, and at the time of reproduction similar field processing is again performed to recover the original composite video signal. It is to be noted that this apparatus disclosed in the above-mentioned Japanese patent application No. 58-204389 does not constitute prior art to the present invention since the above-mentioned Japanese application is not published by the filing data, Mar. 1, 1984, of another Japanese patent application No. 59-39468 from which priority is claimed for the present application. This apparatus invented prior to the present invention is referred to as applicant's earlier invention throughout the specification.

Figure 3:
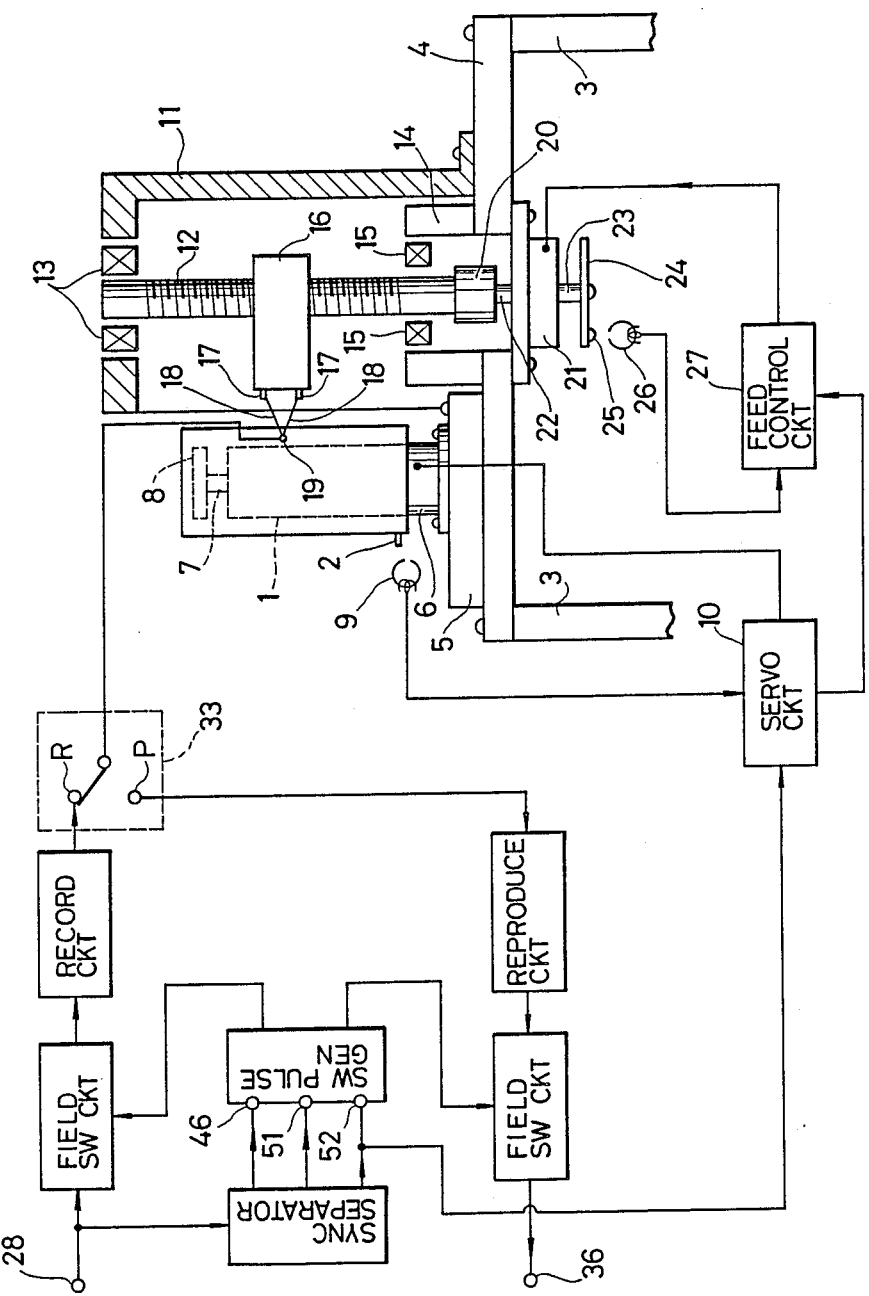
FIG. 3 is a diagram of apparatus for recording/reproducing a composite video signal, which appartus has been devised by the inventors of the present invention prior to the present invention.

In the apparatus for recording/reproducing a composite video signal according to the applicant's earlier invetion shown in FIG. 3, components corresponding the components of the cylindrical magnetic recording medium shown in FIG. 1 and FIG. 2 which were described already, are designated at like references used in FIG. 1 and FIG. 2.

In FIG. 3, all the structural parts of the recording/reproducing mechnism are mounted on a base 4 having a leg portion 3. On a supporting plate fixed to the above-mentioned base 4 is secured a d.c. motor used for driving and rotating a cylindrical magnetic recording medium 1.

To an upper end of a rotary shaft of the d.c. motor 6 is secured a center portion of a magnetic catch 8. Most portions of an outer casing of the d.c. motor 6, the rotary shaft 7 and the magnetic catch 8 have their sizes so as to be embedded in the bore of the hollow cylindrical magnetic recording medium 1 as shown by dotted lines.

On the peripheral surface of the cylindrical magnetic recording medium 1 is formed and fixed a magnetic film, while the inside thereof is hollow so that parts are arranged therein thereby improving utiliztion rate of space. As a result, microminiaturization and drastic reduction in weight of the entire appratus can be achieved.

The cylindrical magnetic recording medium 1 shown in FIG. 3 has a large-diameter bottom communicating with the hollow cavity, and to an inner wall of an upper surface is fixed a disc-like metallic member.

When the cylindrical magnetic recording medium 1 is mounted on its driving member in a state such that the d.c. motor 6 and so on are built in after being inserted from the side of the above-mentioned large-diameter bottom, the metallic member secured to the upper inner wall is magnetically attracted to the magnetic catch 8. In this case, it is a matter of course that the cylindrical magnetic recording medium 1 is mounted on the driving member with the axis of the cylindrical magnetic recording medium 1 and the axis of the rotary shaft 7 being aligned for positioning.

When the d.c. motor 6 is driven, the rotary shaft 7, the magnetic catch 8 and the cylindrical magnetic recording medium 1 rotate together as a single body. When the cylindrical magnetic recording medium 1 rotates, a magnet 2 passes a position which is slightly spaced apart from and faces a magnetic head 9 (a detection coil, Hall generator) per one revolution of the cylindrical magnetic recording medium 1, thereby inducing pulse current in the magnetic head 9 per one revolution of the cylindrical magnetic recording medium 1, which pulse current is fed to a servo circuit 10 described hereinlater.

On the above-mentioned base 4 is secured a frame supporting a mechanism for shifting a record/reproduce element, where the inside of the frame 11 is made hollow. Within the hollow cavity of the frame 11 is arranged a feed screw 12 used for shifting such that it is parallel to generatrices of an outer surface of the cylindrical magnetic recording medium 1. One end of the above-mentioned feed screw 12 is rotatably supported by a bearing 13 while a portion close to the other end of the feed screw 12 is rotatably supported by a bearing 15. The reference 14 is a bearing supporting member which supports the bearing 15, and this bearing supporting member 14 is secured to the base 4.

The reference 16 is a shifting member having a threaded hole to be screwed by the feed screw 12 and a hole to be penetrated by a guide bar which is not shown, and this shifting member 16 has head bases 17, 17 which are detachable. To the above-mentioned haed bases 17, 17 are secured base ends of elongate rods 18, 18. The above-mentioned elongate rods 18, 18 are exposed outside the frame 11 via an elongate hole made in the frame 11, while tip portions thereof are secured to form a shape of V constructing a cantilever, and a record/reproduce element (magnetic head) 19 is secured to the tip portion of the cantilever.

The above-mentioned elongate hole made in the frame 11 is arranged so that its longitudinal direction corresponds to the direction of the axis of the cylindrical magnetic recording medium 1. The above-mentioned feed screw 12 is coupled with an upper rotary shaft 22 of a shifting motor 21 via a gear box 20.

The reference 23 is a lower rotary shaft of the shifting motor 23, and to this rotary shaft 23 is attached a disc 24 to which a magnetic piece 25 is sucured. The reference 26 is a magnetic head (detection coil, Hall generator), and the magnetic piece 25 secured to the above-mentioned and the magnetic head 26 constitute a rotary encoder which generates pulses having a period corresponding to the rotational period of the shifting motor 21.

When the shifting motor 21 rotates, the rotational force thereof is fed via the rotary shaft 22 to the gear box 20, and the feed screw 12 is rotated after the speed is reduced by the gear box 20. In addition, the rotational force of the above-mentioned shfting motor 21 causes the disc 24 to rotate via the rotary shaft 23.

The shifting member 16 moves to upper or lower direction in the drawing between the bearing 13 and the bearing 15 in accordance with the rotational direction of the shifting motor 21, and accordingly the magnetic head 19 also moves in a direction of the axis of the recording surface of the cylindrical magnetic recording medium 1.

The disc 24, magnetic piece 25 and the magnetic head 26 forming the rotary encoder are arranged that the magnetic head 26 induces a pulse current across its winding each time of a single revolution of the shifting motor 21, and this pulse is supplied to a feed control circuit 27 which will be described hereinlater. When an output signal from the feed control circuit 27 is supplied to the shifting motor 21, control of the rotation of the shifting motor 21 is carried out such that the magnetic head 19 is shifted by a distance corresponding to a single recording track pitch during a single revoultion of the cylindrical magnetic recording medium 1.

The reference 28 is an input terminal for an input signal which is an objective of recording, and a composite video signal where horizontal scanning and vertical scanning are effected in accordance with a predetermined scanning standard, is supplied to the input terminal 28. The composite video signal supplied to the input terminal 28 is generally of a standard system, it may be a composite video signal which is reproduced from a VTR.

More specifically, in a VTR, a chrominance signal separated from a composite video signal of a standard system is converted into a low frequency signal, and this is frequency division multiplexed witn an FM luminance signal to be recorded, and on reproduction jitter is corrected by effecting fequency conversion using a signal having the jitter occurred during record/reproduce process, and a chrominance signal reconverted into the original band is obtained and then this reproduced chrominance signal is multiplexed with an FM demodulated luminance signal to be outputted as a reproduced composite vide signal.

In this way in the reproduced composite video signal from a VTR, jitter is corrected for preventing the occurrence of color phase irregularity due to jitter of a choraminance signal whereas jitter of the luminance signal is not corrected, and therefore, frequency interleaving relationship between the luminance signal and the chronimance signal of the reproduced composite video signal from the VTR is disturbed, and therefore such a signal cannot be said as a composite video signal according to a standard system when strictly speaking. However, the reproduced composite video signal from the VTR is a composive video signal in which horizontal scanning and vertical scanning are effected in accordance with a predetermined scanning standard, and therefore, the reproduced composite video signal from the VTR can be used as a composite video signal in the apparatus for recording/reproducing a composite video signal shown in FIG. 3. Furthermore, in the case that the composite video signal to be an objective of recording/reproducing is a composite video signal of a standard color TV system, a composite video signal of any of NTSC, PAL and SECAM can be applied theoretically, and in the following description it is assumed that the composite video signal is of NTSC system.

The composite video signal of NTSC system fed to the input terminal 28 is fed to a field switching circuit 29 and to a sync separator 30. The sync separator 30 separates the composite sync signals and supplies the same to a switching pulse generator 31. A vertical sync signal of the above-mentioned composite sync signals is fed to the switching pulse generator 31 and to a servo circuit 10. The servo circuit 10 generates a phase error signal with phase comparison between the detection pulse of the d.c. motor rotation and the vertical sync signal, and controls the rotation of the d.c. motor 6 so that the d.c. motor 6 and the cylindrical magnetic recording medium 1 rotate at a rotaional period equal to the vertical scanning period.

The output signal from the above-mentioned servo circuit 10 is also fed to the feed control circuit 27 to be compared with a field pulse obtained from the magnetic head 26 and then is converted into the phase error signal corresponding to the phase difference to be fed to the shifting motor 21. As a result, the rotation of the shifting motor 21 is controlled so that the magnetic head 19 is shifted by a distance corresponding to a given recording track interval during a single revolution of the cylindrical magnetic recording medium 1 as described in the above.

Figure 4:
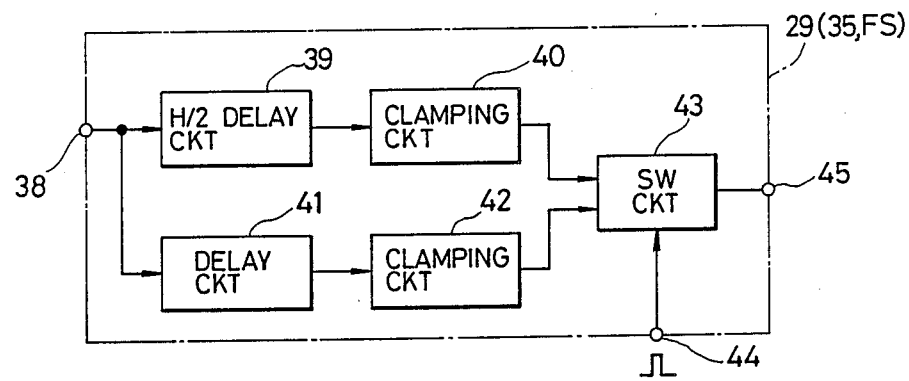
FIG. 4 is a block diagram showing one example of a structure of a field switching circuit.

On the other hand, the field switching circuit has a structure as shown in FIG. 4. The composite video signal of NTSC system fed to an input terminal 38 is fed to a H/2 delay circuit 39 and to another delay circuit 41. The composite video signal delayed by a period of H/2 by way of the H/2 delay circuit 39 is supplied to a clamping circuit 40.

The delay circuit 41 supplies the composite video signal to a clamping circuit 42 after giving a slight amount of delay, which is much smaller than H/2 period, for correcting an error in the amount of delay in the delay circuit 39. As the above-mentioned delay circuits 39 and 41 may be used shift registers using CCD for instance.

The composite video signal, to which d.c. voltages are added by the above-mentioned clamping circuits 40 and 42, have a time difference of H/2 therebetween, and are supplied to a switching circuit 43. The switching circuit 43 performs switching operation in response to switching pulses fed to a terminal 44 such that for instance, when the switching pulse is of high level, the H/2 delayed composite video signal fed from the clamping circuit 40 to the switching circuit 43 is outputted to an output terminal 45, and when the switching pulse is of low level, the nondelayed composite video signal fed from the clamping circuit 42 to the switching circuit 43 is outputted to an output terminal 45.

Figure 5:
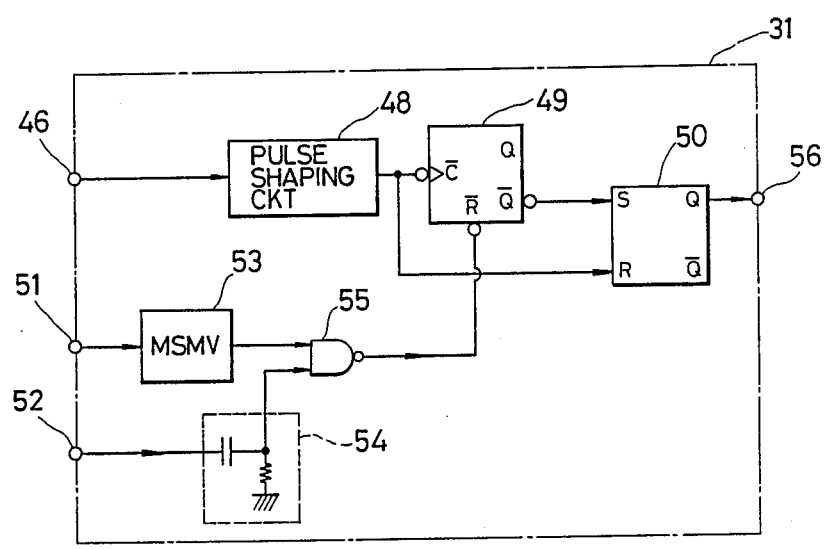
FIG. 5 is a block diagram showing one example of a structure of a switching pulse generator shown in FIG. 3.

The above-mentioned switching pulse supplied to the switching circuit 43 is generated by the switching pulse generator 31 of FIG. 3, as a switching pulse generator 32 may be used one having a structure as shown in FIG. 5 for instance.

In the switching pulse generator 31 shown in FIG. 5, an input terminal 46 is arranged to receive equalizing pulses from the sync separator 30, and the equalizing pulse supplied to the input terminal 46 is fed to a pulse shaping circuit 48 for triggering the pulse shaping circuit 48 by a rising edge thereof.

A waveform of the composite video signal around the vertical blanking period of odd fields is such that shown in FIG. 6(a), while a waveform of the composite video signal around the vertical blanking period of even fields is such that shown in FIG. 6(b), and equalizing pulses respectively exist in a period of 3H before and after the vertical sync signal in both the odd fields and even fields.

In the above-mentioned switching pulse generator 31, the pulse shaping circuit 48 generates pulses shown in FIG. 7(d), which rise with a first pulse within equalizing pulses preceding to a vertical sync signal and fall during incoming period of equalizing pulses following the vertical sync signal, and the generated pulses are fed to a trigger terminal of a flip-flop 49.

The flip-flop 49 has a structure such that the polarity of a Q output is inverted with a falling edge (trailing edge) of an input pulse at the trigger terminal, and a $\overline{Q}$ output assumes high level with an odd-field detection pulse fed to a reset terminal.

The above-mentioned odd-field detection pulse is generated as follows. The horizontal sync signal fed from the sync separator 30 to an input terminal 51 is fed to a monostable multivibrator 53. An output from the monostable multivibrator 53 is arranged to be a symmetrical square wave having a duty cycle of 50 percent, and is fed to an input terminal of a NAND gate 55.

The horizontal sync signal in odd fields is such that shown in FIG. 6(e), and therefore, an output from the monostable multivibrator 53 in odd fields is as shown in FIG. 6(f).

On the other hand, the horizontal sync signal in even fields is such that shown in FIG. 6(h), and therefore, an output from the monostable multivibrator 53 in even fields is as shown in FIG. 6(i).

Meanwhile, since the vertical sync signal shown in FIG. 6(c) and FIG. 7(b) in the condition that its phase is delayed from that of the original composite video signal (see FIGS. 6(a) and 6(b)) of the standard system due to the retardation in the sync separator 30 is supplied to a differentiator 54 via an input terminal 52, the differentiator 54 produces differential pulses respectively corresponding to the position of a leading edge (rising edge) and a position of a trailing edge (falling edge) of the vertical sync signal of FIG. 6(c) as shown in FIG. 6(d), and these differential pulses are fed to the other input terminal of the NAND gate 55.

During odd fields since the NAND gate 55 is supplied with pulses of FIGS. 6(d) and 6(f), a negative polarity pulse is outputted from the NAND gate 55 as shown in FIG. 6(g). On the other hand, during even fields since the NAND gate 55 is supplied with pulses of FIGS. 6(d) and 6(i), an output signal, which always assumes a high level, is outputted from the NAND gate 55 as shown in FIG. 6(j).

More specifically, in the case of an even field, since the output pulse shown in FIG. 6(i) from the monostable multivibrator 53 is phase diviated by H/2 compared to an output pulse on an odd field, the two inputs of the NAND gate 55 both turn to low level at the instant of the occurrence of the differential pulse shown in FIG. 6(d), and therefore, a signal always assuming high level shown in FIG. 6(j) is outputted from the NAND gate 55 in the case of an even field.

In this way, since negative polarity pulse is derived as shown in FIG. 6(g) and FIG. 7(e) from the NAND gate 55 only during odd fields, this negative polarity pulse can be supplied to a reset terminal of the flip-flop 49 as an odd-field detection pulse.

Then the $\overline{Q}$ output from the flip-flop 49 is a pulse whose polarity is inverted each time of the trailing edge of the output pulse (see FIG. 7(d)) from the pulse shaping circuit 48 as shown in FIG. 7(f), and as will be understood from the comparison to the signal shown in FIGS. 7(a) to 7(c), the $\overline{Q}$ output from the flip-flop 49 always assumes low level in odd fields and high level in even fields. FIG. 7(a) is a waveform showing the input composite video signal in units of a field, and "0" represents odd fields while "E" represents even fields. FIG. 7(c) shows equalizing pulses.

The $\overline{Q}$ output from the flip-flop 49 is applied to a set terminal of a flip-flop 50 so as to put the flip-flop 50 in a set state by a leading edge thereof. On the other hand, a pulse shown in FIG. 7(d) derived from the pulse shaping circuit 48 is applied to the reset terminal of the flip-flop 50 so as to reset the same by the leading edge thereof.

Accordingly, from the Q output terminal of the flip-flop 50 is derived an asymmetrical square wave of 2-field period assuming high level during odd field picture periods and low level during odd field picture periods and vertical sync signal periods of odd and even fields as shown in FIG. 7(g), and this signal is fed from an output terminal 56 to be fed to the input terminal 44 shown in FIG. 4 in turn as the switching pulse.

From the switching circuit 43 shown in FIG. 4, is selectively fed a H/2 delayed signal of odd field picture periods which is outputted from the clamping circuit 40, to the output terminal 45 in correspondence with the high level periods of the asymmetrical switching pulse, and are selectively fed, as a time series, an odd field composite video signal and even field vertical sync signal which are outputted from the clamping ciruit 42 and are not substantially delayed to the output terminal 45 in correspondence with the low level periods of the above-mentioned asymmetrical square wave.

FIG. 7(h) is a diagram showing schematically signals arranged in series on time base which signals are fed from the output terminal 45 of the switching circuit 43 as described in the above, and in this diagram "D" indicates an outputting period of H/2 delayed signal and "N" indicates an outputting period of nondelayed signal.

Accordingly, a H/2 delayed video signal (except for vertical sync signal) of even fields, a composite video signal, which is not substantially delayed, of odd fields, and vertical sync signals of odd and even fields are outputted from the field switching circuit 29 in the apparatus for recording/reproducing a composite video signal according to the applicant's earlier invention with these signals being switched at a given timing.

The above-mentioned output signal from the field switching circuit 29 is supplied to a recording circuit 32 to be arranged to a recording signal having a signal form (for instance, frequency modulated wave) suitable for magnetic recording/reproducing, and is then supplied to the magnetic head 19 via a fixed contact R and a movable contact of a record/reproduce chageover switch 33. As a result, a full field is recorded on a magnetic surface of the cylindrical magnetic recording medium 1 driven and rotated at a rotational period equal to the vertical scanning period at the rate of one field per one revolution.

On successive recording tracks formed on the cylindrical magnetic recording medium 1 by successive field signals in the above-mentioned manner are recorded respective field signals in a condition that the recording positions of horizontal sync signal and the recording positions of vertical sync signal are aligned, throughout all the recording tracks, in line in a direction of the width of the recording tracks.

Therefore, a recording track pattern of the successive field signals recorded on the cylindrical magnetic recording medium 1 is such that shown in FIG. 8(a) where the recording positions HP of the horizontal sync signal in respective recording tracks t1, t2, t3 . . . are aligned in line in a direction of the width of recording tracks while the recording positions VP of the vertical sync signal are aligned in line in a direction of the width of recording tracks (wherein slight deviation in the recording positions due to jitter components is ignored).

Nextly, in the apparatus for recording/reproducing a composite video signal shown in FIG. 3, when a signal (FM composite video signal) recorded in the cylindrical magnetic recording medium 1 by way of the magnetic head 19 with the movable contact of the record/reproduce changeover switch 33 being switched to the fixed contact P side, a reproduced signal reproduced by the magnetic head 19 is supplied to a reproduce circuit 34 to cause the same to output a reproduced composite video signal in which an FM composite video signal is FM demodulated.

Since the reproduced composite video signal outputted from the reproduce circuit 34 as mentioned in the above does not have a form which performs interlaced scanning, normal reproduced pictures cannot be obtained even though such a signal is fed to a monitor receiver. Therefore, the above-mentioned output signal from the reproduce circuit 34, i.e. the reproduced composite video signal, is sent to an output terminal 36 after the composite video signal is changed to a signal which performs regular interlaced scanning by arranging such that no delay is given to signal portions which have been delayed by H/2 on recording, in the field switching circuit 35, and H/2 delay is given to signal portions which have not substantially been delayed on recording.

As the above-mentioned field switching circuit 35 may be used one having a structure similar to the aforementioned field switching circuit 29 (for instance, one having a structure described with reference to FIG. 4).

When a switching pulse in the form of an asymmetrical square wave shown in FIG. 7(g), which is outputted from the switching pulse generator 31 (for instance one having a structure described with reference to FIG. 5) arranged to operate for generating a switching pulse in receipt of various signals separated, by the sync separator 30, from the composite video signal supplied to the input terminal 28, the reproduced composite video signal is changed to a signal which is similar to the orignal composite video signal performing regular interlaced scanning to be fed to the output terminal 36 by causing the field switching circuit 35 not to substantially delay the reproduced composite video signal in the high-level period of the switching pulse and to delay the reproduced composite video signal by H/2 in the low level period of the switching pulse.

Although it has been described in the above as to H/2 delay of even field signals (except for vertical sync signal), the signals to be delayed may be those (except for vertical sync signal) of odd fields. In addition, it may be possible to arrange that recording tracks shown by recording track pattern in FIG. 8(b) are formed on the cylindrical magnetic recording medium 1 by recording a full field on the magnetic surface of the cylindrical magnetic recording medium 1 driven and rotated at a period equal to the vertical sync period, at the rate of one field per one revolution, by producing a signal which is obtained by switching between H/2 delayed composite video signal of one field and a substantially nondelayed composite video signal of one field by arranging the switching pulse to be fed to the above-mentioned switching circuit to be a symmetrical square wave having a period of two fields (in order to obtain a symmetrical wave switching pulse, an output Q triggered by a rising edge of an output pulse from the pulse shaping circuit 48 is used as the switching pulse using a trigger terminal C for positive polarity pulse as an input trigger of the flip-flop 49 of FIG. 5).

In the recording track pattern shown in FIG. 8(b), the recording positions of the horizontal sync signals of the successive recording tracks formed on the cylindrical magnetic recording medium 1 by the successive field signals are alinged in line in a direction of the width of recording tracks, while the recording positions of the vertical sync signals of successive fields are in a recording state that advance and retardation by H/2 are repeated alternately per one revolution of the cylindrical magnetic recording medium 1. The arrangement is such that a field longer by H/2 and a field shorter by H/2 are alternately arranged. When the field signal longer by H/2 is delayed by H/2 by the field switching circuit 35 on reproduction, although most portions of the reproduced composite video signal are restored to the original composite video signal, original odd and even fields are mixed since a signal of H/2 period in the field longer by H/2 is inserted immediately before the last end switching point of a field whose period is shorter by H/2. However, since there is a field-correlation between odd field signals and even field signals, the reproduced composite video signal can be treated as an equivalent to the original composite video signal if field switching point is performed during vertical blanking period.

In the above-described apparatus for recording/reproducing a composite video signal shown in FIG. 3 according to applicant's earlier invention, the recording positions of the horizontal sync signals in respective recording tracks recorded in parallel on the rotary recording medium are in a condition of aligning in line in a direction of the width of recording tracks, while the recording positions of the vertical sync signals in respective recording tracks recorded in parallel on the rotary recording medium are in a condition of aligning in line in a direction of the width of recording tracks or in a condition of substantially aligning in the direction of width of recording tracks (alignment with H/2 deviation), and therefore, according to the apparatus of FIG. 3, the above-mentioned conventional problems can be satisfactorily resolved, but reseaches made thereafter has made it clear that there are the following problems to be resolved in the apparatus for recording/reproducing a composite video signal shown in FIG. 3.

Namely, in the apparatus for recording/reproducing a composite video signal shown in FIG. 3, as described in the above, the reproduced composite video signal reproduced from the cylindrical magnetic recording medium 1 is supplied to the field switching circuit 35 for giving no delay to signal portions which have been delayed by H/2 on recording and for giving delay to signal portions which have substantially not been delayed on recording so as to change the reproduced composite video signal to a signal which is capable of performing regular interlaced scanning in the same manner as the original composite video signal. However, the switching operation in the field switching circuit 35 is not necessarily performed with a correct timing, and it has been made clear that satisfactory reproduced pictures cannot be obtained due to such operation, and the resolution of this problem has been desired.

The above-mentioned problem will be described in detail hereinbelow. In the apparatus for recording/reproducing a composite video signal according to the applicant's earlier invention shown in FIG. 3, the switching pulse to be applied to the switching circuit of the field switching circuit 35 on reproduction is generated by the switching pulse generator 31 on the basis of the composite sync signal (or a signal generated by a reference signal generator built in the appartus for recording/reproducing a composite video signal) separated from the composite video signal supplied to the input terminal 28 in the same manner as the switching pulse fed to the switching circuit of the field switching circuit 29 on recording. Since the timing of appearence of odd fields and even fields in the composite video signal supplied to the input terminal 28 has no relationship with the timing of appearence of odd fields and even fields in the reproduced composite video signal reproduced from the cylindrical magnetic recording medium 1, and since it is impossible to accurately distinguish between odd fields and even fields on the basis of the relative phase relationship between the vertical sync signal and the horizontal sync signal of the reproduced composite video signal because the S/N of the reproduced signal from the cylindrical magnetic recording medium 1 has been deteriorated due to jitter, dropout or the like, it will be readily understood that field switching operation performed by the field switching circuit 35 is not done with a correct timing in the apparatus for recording/reproducing a video signal shown in FIG. 3 for instance when considering a case that the reproduction of the composite video signal recorded on the cylindrical magnetic recording medium 1 is performed after the rotation of the cylindrical magnetic recording medium 1 is once interrupted after recording of the signal.

For the above reason, in the apparatus for recording/reproducing a composite video signal, phase diviation of the vertical sync signal and the horizontal sync signal of respective fields of the reproduced composite video signal is apt to occur or the period of one field auumes 262H or 263H arbitrarily and therefore, the reproduced signal is not of a standard system while a reproduced picture moves up and down tremblingly by 1H due to the variation in the time position of a leading edge of the vertical sync signal.

The detailed contents of the apparatus for recording/reproducing a composite video signal according to the present invention will be described with reference to accompanying drawings hereinbelow. FIG. 9 is a block diagram of an embodiment of the apparatus for recording/reproducing a composite video signal according to the present invention. In FIG. 9, components corresponding to those in the apparatus for recording/reproducing a composite video signal of FIG. 3 are designated at like references.

In FIG. 9, since the structure of components indicated at the references 1 through 27 are the same as those shown in FIG. 3, description of the structure and operation of these parts is omitted.

In FIG. 9, the reference 28 is an input terminal for receiving a composite video signal which is an objective of recording, and the references 33, 63 and 64 are record/reproduce changeover switches. The above-mentioned record/reproduce changeover switches 33, 63 and 64 are used such that their movable contacts come into contact with fixed contacts R respectively when the apparatus is put in record mode and the movable contacts come into contact with another fixed contacts P when the apparatus is put in reproduce mode with a record/reproduce mode indicating signal fed to a terminal 73 being used as a changeover control signal.

The composite video signal Sa fed to the composite video signal input terminal 28, which signal is shown in FIG. 10(a), is supplied to the fixed contact R of the record/reproduce changeover switch 63. A sync signal generator 92 is provided to produce a composite sync signal which is synchronized with the input composite video signal fed to the input terminal 28 when the appratus is in record mode. The sync signal generator 92 also produces the composite sync signal in reproduce mode so as to give a reference signal (vertical sync signal Sv) to the servo circuit 10. The sync signal from the sync signal generator 92 is fed to a sync separator 30 in which the vertical sync signal Sv shown in FIG. 10(c) and the horizontal sync signal Sh shown in FIG. 10(b) are separated from the composite sync signal. The above-mentioned both separated signals Sv and Sh are fed to an odd-field/even-field distinguishing circuit 57 while the vertical sync signal Sv is also fed to the servo circuit 10.

The odd-field/even-field distinguishing circuit 57 distinguishes between odd fields and even fields using the vertical sync signal and the horizontal sync signal supplied thereto from the sync separator 30, and outputs an odd/even field determination signal Soe shown in FIG. 11(c) and this odd/even field determination signal is fed to a field switching pulse generator SPG. The odd-field/even-field distinguishing circuit 57 may be readily constructed using a plurality of monostable multivibrators and an AND gate, and as the odd-field-/even-field distinguishing circuit 57 may be used one having a well known structure.

The field switching pulse generator SPG having a structure shown is formed by first and second counters CT1 and CT2, a reset-set flip-flop RSFF, AND gates A1 and A2, a monostable multivibrator MM, an inverter INV, and an OR gate OR, and in practice other structure may be used.

The field switching pulse generator SPG shown in FIG. 9 is supplied, at its terminal 75, with an output signal from the odd-field/even-field distinguishing circuit 57, i.e. the odd/even field determination signal Soe. To a terminal 75 is also supplied the horizontal sync signal Sh outputted from the sync separator 30, and to a terminal 76 is supplied the record/reproduce mode indicating signal, and furthermore, to a terminal 77 is supplied a field switching control signal Sfs (FIG. 10(m) and FIG. 11(g)) produced on the basis of a field distinguishing signal Sf (FIG. 10(f)) reproduced from the cylindrical magnetic recording medium 1 when the apparatus is in reproduce mode where the field distinguishing signal and the field switching control signal will be described hereinlater.

The field switching pulse generator SPG operates such that when the apparatus is put in record mode and when the record/reproduce mode indicating signal supplied to the terminal 76 thereof is of high level, an output pulse Sfr from the reset-set flip-flop RSFF is supplied as a field switching pulse Sfr shown in FIG. 10(i) via the AND gate A1 and the OR gate OR from an output terminal 78 to a terminal 44 of a field switching circuit FS, and when the apparatus is put in reproduce mode and when the record/reproduce mode indicating signal supplied to the terminal 76 thereof is of low level, a pulse Sfp produced by the monostable multivibrator MM triggered by the field switching control signal fed to the terminal 77 as described in the above is supplied as a field switching pulse Sfp shown in FIG. 10(n) and Fug, 11(h) via the AND gate A2 and the OR gate OR from the output terminal 78 to the terminal 44 of the field switching circuit FS.

The generation of the field switching pulse Sfr by the field switching pulse generator SPG having a structure shown in FIG. 9 on the record mode of the apparatus is as follows. The odd/even field determination signal supplied via the terminal 74 to reset terminals of the first and second counters CT1 and CT2 assumes high level from the leading edge of the sync signal of an odd field to a leading edge of a sync signal of an even field, and low level from the leading edge of the sync signal of an even field to a leading edge of a sync signal of an odd field as shown in FIG. 11(c). The above-mentioned first and second counters CT1 and CT2 are both reset at time position of the leading edge of the sync signal of an odd field so as to start counting the pulses of the horizontal sync signal Sh (FIG. 11(b)) fed via the terminal 75 to a clock terminal, from a time position of the leading edge of a sync signal of an odd field.

The first counter CT1 generates a pulse Sca shown in FIG. 11(d) when the count reaches 260, and the pulse is fed to a set terminal S of the reset-set flip-flop RSFF, while the second counter CT2 generates a pulse Scb shown in FIG. 11(e) when the count reaches 523, and the pulse is fed to a reset terminal R of the reset-set flip-flop RSFF.

As a result, the reset-set flip-flop RSFF is put in set state at time position of 260H from the leading edge of the sync signal of an odd field, and is put in reset state at time position of 523H from the leading edge of the sync signal of the odd field, and therefore, an output signal Sfr is outputted from the Q terminal of the reset-set flip-flop RSFF as shown in FIG. 11(f) where the output signal is in a state of assuming a high level for a period between a time position of 260H from a time position of a leading edge of the sync signal of an odd field and a time position of 523H from a time position of the leading edge of the sync signal of the odd field, and low level for a period between a time position of 523H from a time position of the leading edge of the sync signal of the odd field and a time position of 260H from a time position of the leading edge of the sync signal of the odd field.

The field switching pulse Sfp shown in FIG. 10(n) and FIG. 11(h) supplied from the output terminal 78 of the field switching pulse generator SPG to the terminal 44 of the field switching circuit FS when the apparatus is in reproduce mode, is in a state of assuming low level for a period between a time position of 260H from a time position of a leading edge of the sync signal of an odd field and a time position of 523H from a time position of the leading edge of the sync signal of the odd field, and high level for a period between a time position of 523H from a time position of the leading edge of the sync signal of the odd field and a time position of 260H from a time position of the leading edge of the sync signal of the odd field. In other words, the field switching pulse Sfp is of reverse polarity with respect to the above-mentioned field switching pulse Sfr shown in FIG. 10(i) and FIG. 11(f) which is fed from the output terminal 78 of the field switching pulse generator SPG to the terminal 44 of the field switching circuit FS when the apparatus is in record mode.

As described in the above, when the field switching pulse Sfr generated by the field switching pulse generator SPG in the record mode of the apparatus and the field switching pulse Sfp generated by the field switching pulse generator SPG in the reproduce mode of the apparatus are supplied to the terminal 44 of the field switching circuit FS as described in the above, since the field switching circuit FS has a structure described with reference to FIG. 4 for instance, the composite video signal fed to the input terminal 38 is fed to the output terminal 45 as a H/2 delayed signal when the field switching pulse Sfr (or Sfp) supplied to the terminal 44 is of high level or as a nondelayed signal when the field switching pulse Sfr (or Sfp) supplied to the terminal 44 is of low level.

As described in the above, since the field switching pulse Sfr generated by the field switching pulse generator SPG in the record mode of the apparatus and the field switching pulse Sfp generated by the field switching pulse generator SPG in the reproduce mode of the apparatus are of opposite polarity from each other, the signal of a signal period which has been H/2 delayed by the field switching circuit FS on recording is outputted under a condition that H/2 delay is not given thereto by the field switching circuit FS on reproduction, while the signal of a signal period to which H/2 delay has not been given by the field switching circuit FS on recording is outputted under a condition that H/2 delay is given thereto by the field switching circuit FS on reproduction, and the composite video signal sent to the output terminal 36 has a signal form that interlaced scanning of interlacing ratio of 2 to 1 can be satisfactorily performed in the same manner as the original composite video signal fed to the input terminal 28.

Figure 10:
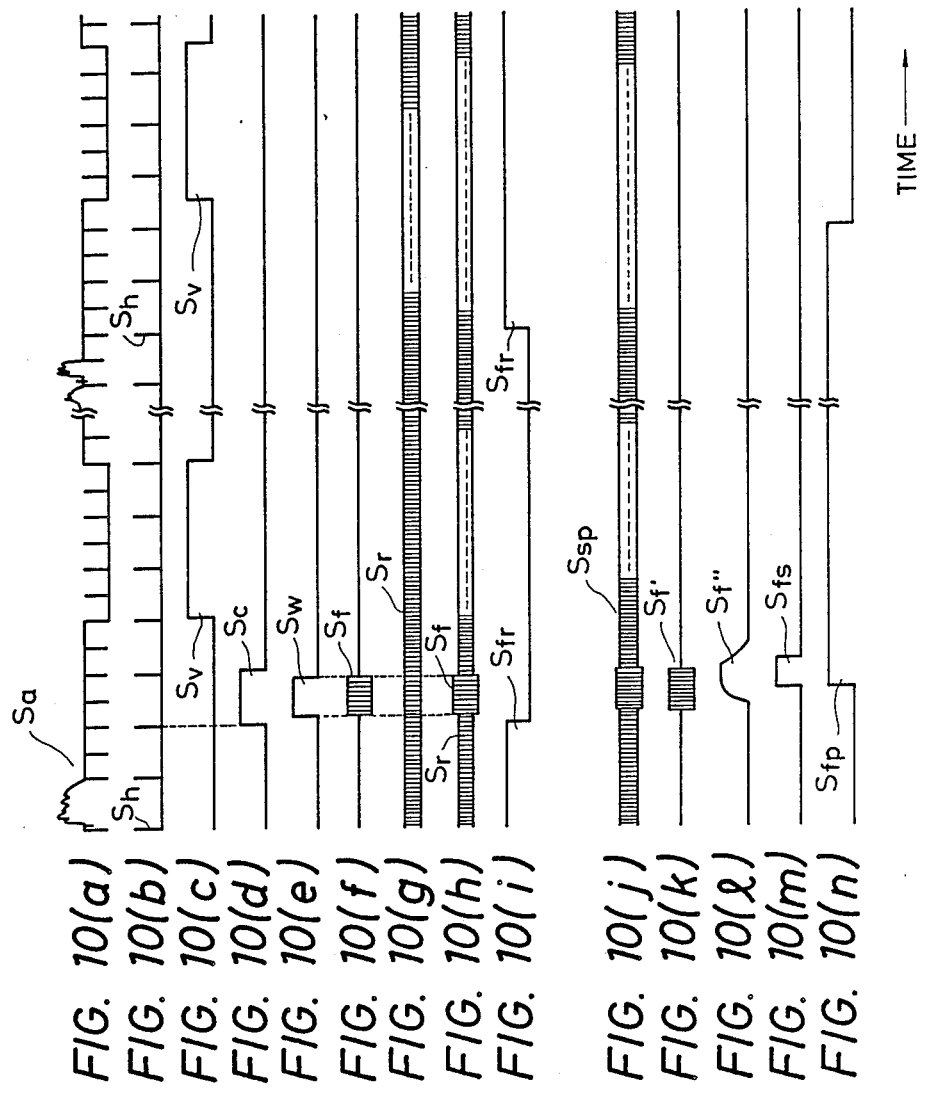
Figure 11:
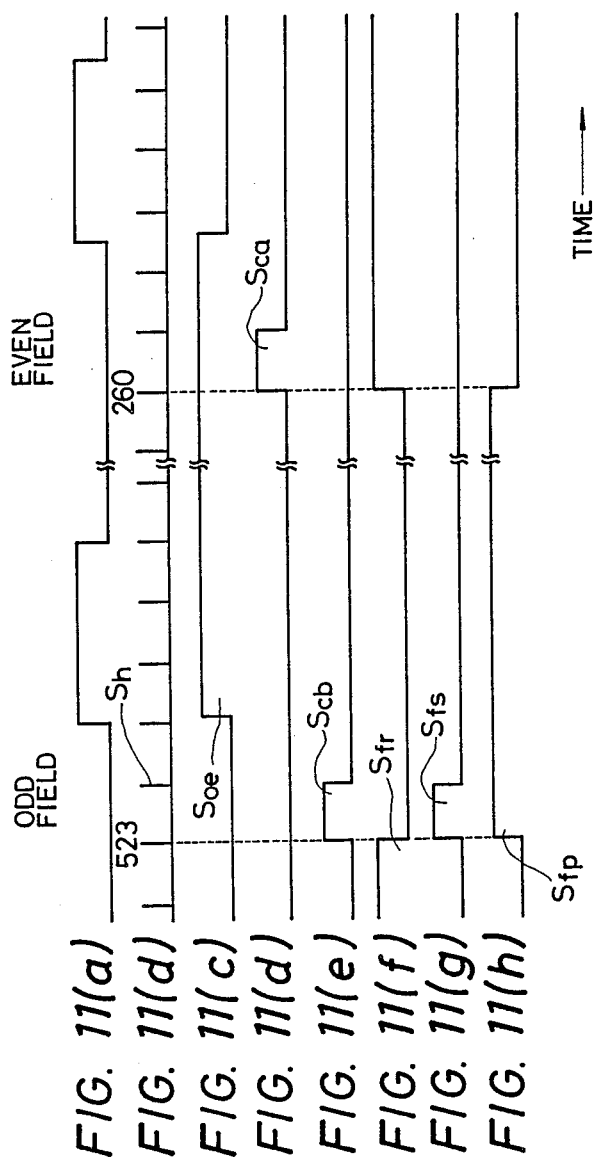

Although the switching state by the field switching circuit FS on recording in the example illustrated in time charts shown in FIG. 10 and FIG. 11 is such that H/2 delay is not given to the signal of odd fields of the composite video signal and H/2 delay is given to the signal of even fields of the composite video signal, it is a matter of cource that the switching state by the field switching circuit FS may be reversed from the above-mentioned case when putting the present invention into practice.

In addition, although the example illustrated in time charts shown in FIG. 10 and FIG. 11 is directed to a case where vertical sync signals are respectively included in a predetermined signal period to which the H/2 delay is given by the field switching circuit FS and in a predetermined signal period to which no delay is given, such signal period to which the H/2 delay is given by the field switching circuit FS and the signal period to which no delay is given are not necessarily required to include vertical sync signals when putting the present invention into practice.

When the composite video signal fed to the input terminal 28 under the condition that the apparatus is in record mode is applied via the fixed contact F of the record/reproduce change over switch 63 and the movable contact thereof to the field switching circuit FS, the composite vide signal is changed to a modified composite video signal within the field switching circuit FS such that H/2 delay is given to a predetermined first signal period of the composite video signal and no H/2 delay is given to a predetermined second signal period of the composite video signal.

The above-mentioned modified composite video signal sent from the field switching circuit FS is suplied via the movable contact of the record/reproduce change-over switch 64 and a circuit of its fixed contact R to the record circuit 32. The record circuit 32 changes the above-mentioned modified composite video signal to a recording signal Sr (FIG. 10(g)) suitable for recording and reproducing, for instance, a recording signal Sr having a signal form of an FM signal, or changing to a recording signal Sr haing a signal form of frequency division multiplexed signal using an FM signal of a luminance component and a low-frequency chrominance signal with the luminance signal component being frequency modulated and the chrominance signal being converted into the low-frequency chrominance signal.

In the embodiment of FIG. 9, the recording signal Sr shown at FIG. 10(g) which is produced by the above-mentioned record circuit 32 is fed to a mixing circuit 62 in which a field distinguishing signal Sf (FIG. 10(f)) is given to the recording signal Sr. The signal shown at FIG. 10(g) is in a state that the field distinguishing signal Sf is superposed upon the recording signal Sr by the mixing circuit 62.

The field distinguishing signal is located at a given time position with respect to a predetermined vertical sync signal of every frames of the recording signal so that odd field signal periods and even field signal periods of the composite video signal can be accurately distinguished from each other on reproduction on te basis of the time position of the field distinguishing signal Sf. To this end the field distinguishing signal Sf is added to the recording signal Sr to be recorded on the cylindrical magnetic recording medium 1 together with the recording signal Sr.

The field distinguishing signal Sf may be added to the composite video signal per se or to the modified composite video signal per se such that it is separatable, or to the recording signal such that it is separatable. In any of these cases, it is necessary to arrange that the addition of the field distinguishing signal does not cause the deterioration of reproduced pictures.

Therefore, it is desired to give considertation such that for instance, a signal portion, where the field distinguishing signal Sf is to be added in the case that the field distinguishing signal is added to the composite video signal per se or to the modified composite video signal, may be selected from periods within the vertical blanking period execept for the period of the vertical sync signal for instance.

On the other hand, in the case that the field distinguishing signal Sf is added to the recording signal Sr such that the former is separatable from the latter, the time position where the field distinguishing signal Sf is to be added may be signal periods other than the vertical blanking period.

The signal form of the field distinguishing signal Sf may be arbitrary as long as it is separatable from the signal to which the field distinguishing signal is added and the addition of the field distinguishing signal Sf does not affect the reproduced picture quality.

The field distinguishing signal Sf in the embodiment of FIG. 9 has a frequency relationship with respect to the recording signal Sr in the form of frequency modulated wave so that the former can be frequency division multiplexed, and an example of a case is shown where a burst (for instance, a burst of a single frequency of 900 KHz) of a single frequency giving no undesirable influence to the original signal is placed at a period between a $523^{th}$ horizontal sync signal from the time position of the leading edge of the vertical sync signal of an odd field and a $524^{th}$ horizontal sync signal from the time position of the leading edge of the vertical sync signal of the odd field.

Namely, in the embodiment of the apparatus for recording/reproducing a composite video signal accoding to the present invention shown in FIG. 9, the reference 58 is a counter which is rest by the odd/even field determination signal Soe outputted from the odd-field/even field determining circuit 57 so as to start counting the horizontal sync signals Sh supplied from the sync separator 30 from the time position of the leading edge of the vertical sync signal of an odd field.

The count of the above-mentioned counter 58 is fed to a coincidence circuit 59 which may be formed by a well known digital comparator, and when the count of the above-mentioned counter 58 reaches a numerical value 523 preset in the coincidence circuit 58, a coincidence pulse (FIG. 10(d)) is outputted to be fed to an oscillator 60 and to an open/close control signal generator 79.

The oscillator 60 outputs a burst signal having a specific single frequency from the instant of application of the above-mentioned coincidence pulse Sc to supply the same to an open/close circuit 61.

The open/close control signal generator 79 generates an open/close control signal Sw which exists at a period between a 523th horizontal sync signal from the time position of the leading edge of the vertical sync signal of an odd field and a 524th horizontal sync signal from the time position of the leading edge of the vertical sync signal of the odd field as shown in FIG. 10 (e) to control (open or close) the open/close circuit 61 by supplying the same thereto.

As a result, the field distinguishing signal Sf formed by a burst having a specific single frequency is supplied from the open/close circuit 61 to the mixing circuit 62 during the period between a 523th horizontal sync signal from the time position of the leading edge of the vertical sync signal of an odd field and a 524th horizontal sync signal from the time position of the leading edge of the vertical sync signal of the odd field, and the field distinguishing signal Sf is added to the recording signal Sf as described in the above.

The output signal from the mixing circuit 62 is supplied via the fixed contact R of the record/reproduce switch 33 and the movable contact of the same to the magnetic head 19 so as to be recorded on the cylindrical magnetic recording medium 1 rotating at a rotational period equal to the vertical scanning period of the composite video signal which is an objective of recording.

The signals in recording tracks successively formed on the cylindrical magnetic recording medium 1 in this way are in a state that the recording positions of all the horizontal sync signals are alinged in line in the direction of width of the recording tracks as shown in FIG. 8(b).

Nextly, when the apparatus is put into reproduce mode, the movable contacts of the record/reproduce changeover switches 33, 63 and 64 come into contact with the fixed contacts P. Under this condition, the reproduced signal reproduced from the cylindrical magnetic recording medium 1 by way of the magnetic head 19 is supplied via the movable contact and the fixed contact P of the record/reproduce changeover switch 33 to a preamplifier 94 and an output signal of the preamplifeir 94 is fed to a reproduce circuit 34 and to a switch 65.

In the reproduce cicuit 33, the FM composite video signal is FM demodulated to be changed to the modified composite signal which is supplied via the fixed contact P and the movable contact of the record/reproduce changeover switch 63 to the field switching circuit FS.

In the field switching circuit FS, H/2 delay is not given to the reproduced modified composite video signal supplied thereto in connection with signal periods which have been delayed by H/2 on recording, and H/2 delay is given in connection with signal periods which have not been delayed by H/2 on recording, to output the reproduced composite video signal from the field switching circuit FS to the output terminal 36 with a signal form with which regular interlaced scanning can be performed in the same manner as the original composite video signal.

In order that the field switching circuit FS operates such that the reproduced composite video signal having a signal form so that regular interlaced scanning can be performed in the same manner as the original composite video signal is outputted from the output terminal 36, the field switching pulse or the second control signal Sfp supplied from the field switching pulse generator SPG to the field switching circuit FS on reproducing has to correctly have a polarity reverse to that of the field switching pulse Sfr supplied from the field switching pulse generator SPG to the field switching circuit FS on recording.

In the apparatus for recording/reproducing a composite video signal according to the present invention, odd field periods and even field periods of the reproduced modified composite video signal are accurately distinguished from each other in accordance with the field distinguishing signal Sf recorded by adding the same to the recording signal Sr on recording, and it is arranged that the polarity of the field switching pulse Sfp supplied from the field switching pulse generator SPG to the field switching circuit FS on reproducing is automatically set to one reverse to the polarity of the field switching pulse Sfr supplied from the field switching pulse generator SPG to the field switching circuit FS on recording.

In FIG. 9, the reproduced field distinguishing signal Sf' included in the output signal from the preamplifier 94 on reproducing is extracted by a band pass filter 66 connected to the switch 65 provided when necessary. FIG. 10(j) shows a reproduced signal Sp supplied to the reproduce circuit 34, and FIG. 10(k) shows the reproduced field distinguishing signal Sf' extracted by the above-mentioned band pass filter 66.

The above-mentioned switch 65 is tuned on and off in accordance with a control signal fed from an inverter 72 which is responsive to an output signal from a reproduced signal sync separator 71. The reproduced signal sync separator 71 is responsive to the output composive vide signal from the field switching circuit FS so as to separate reproduced horizontal sync signal therefrom. Since this switch 65 is provided for preventing malfunction which has a chance to occur when a signal having a tracking reference signal existing around the horizontal sync signal is reproduced, by such that it is turned off every reproduced horizontal sync signals and turned on every periods between reproduced horizontal sync signals, this switch 65 may be omitted when the apparatus for recording/reproducing a composite video signal according to the present invention is put into practice.

The reproduced field distinguishing signal Sf' extracted by the band pass filter 66 is changed to a signal Sf'' shown in FIG. 10(l) after being integrated by an integrater 68 after being rectified and filtered by a rectifier/filter circuit 67.

The above-mentioned signal Sf'' is first sliced by an appropriate threshold voltage in a voltage comparator 69 and is then pulse shaped by a pulse shaping circuit 70 to be a field switching control signal Sfs, shown in FIG. 10(m), which is then fed via the terminal 77 of the field switching pulse generator SPG to the monostable multivibrator MM as described in the above.

The monostable multivibrator MM generates a field switching pulse Sfp (FIG. 10(n), FIG. 11(h)) which assumes high level for a period of 262H from the instant of application of the field switching control signal Sfs thereto, and this field switching pulse Sfp is supplied via the AND gate A2, the OR gate OR and the output terminal 78 to the field switching circuit FS.

Although, in the above described embodiment, the field distinguishing signal Sf to be addd to the recording signal Sr is one per one frame, and the instant of the location of the field distinguishing pulse Sf is arranged to exist around the instant corresponding to instant where every other cycle switching operation is performed among switching operations of signals to be performed every fields in the field switching circuit FS, namely, in a period between a 523$^{th}$ horizontal sync signal from the time position of the leading edge of the vertical sync signal of an odd field and a 524$^{th}$ horizontal sync signal from the time position of the leading edge of the vertical sync signal of the odd field in the above-mentioned example, the time position of the field distinguishing signal Sf to be added to the recording signal Sr one for each frame may be set to the exactly same time as the instant of switching operation to be performed by the field switching circuit FS.

In the case that the time position where the field distinguishing signal Sf exists is totally different from the instant where swtching operation is performed with respect to a signal in the the field switching circuit FS as described in the above, an unshown monostable multivirator for time delay may be triggered by the field switching control signal Sfs produced on the basis of the reproduced field distinguishing signal Sf', and an output pulse is outputted where the time position of the trailing edge of the output pulse from the monostable multivibrator for time delay corresponds to an instant of signal switching operation by the field switching circuit FS, and the monostable multivrator is arranged to be triggered at the time position of the trailing edge of the output pulse thereby generating the field switching pulse Sfp on reproducing.

In the apparatus for recording/reproducing a composite video signal according to the present invention, the field distinguishing signal Sf to be added to the recording signal Sr on recording in not necessarily placed one by one for each field at specific time positions respctively corresponding to successive fields, and in the case one field distinguishing signal is placed for each field, the instant of the location of the field distinguishing signal Sf may be arbitrarily specified.

In the case that different field distinguishing signals are provided respectively for an odd field and an even field which constitute one frame, as described in the above, it is necessary that the field distinguishing signals have signal forms such that the field distinguishing signal provided to the odd field can be readily distinguished from the field distinguishing signal provided to the even field (for instance, the two field distinguishing signals may have different frequencies so as to be separately derived through frequency separation or the two field distinguishing signals have different time lengths or waveforms to be separately derived on reproducing).

In the case that different field distinguishing signals are provided respectively for an odd field and an even field which constitute one frame, as described in the above, there is an advantage that the structure of the reproudcing system can be simplified because a field switching pulse can be generated using only a single reset-set flip-flop when the reset-set flip-flop is put in set state by a field switching control signal produced on the basis of one of the two reproduced field distinguishing signals and the reset-set flip-flop is put in reset state by a field switching control signal produced on the basis of the other of the two reproduced field distinguishing signals.

Figure 12:
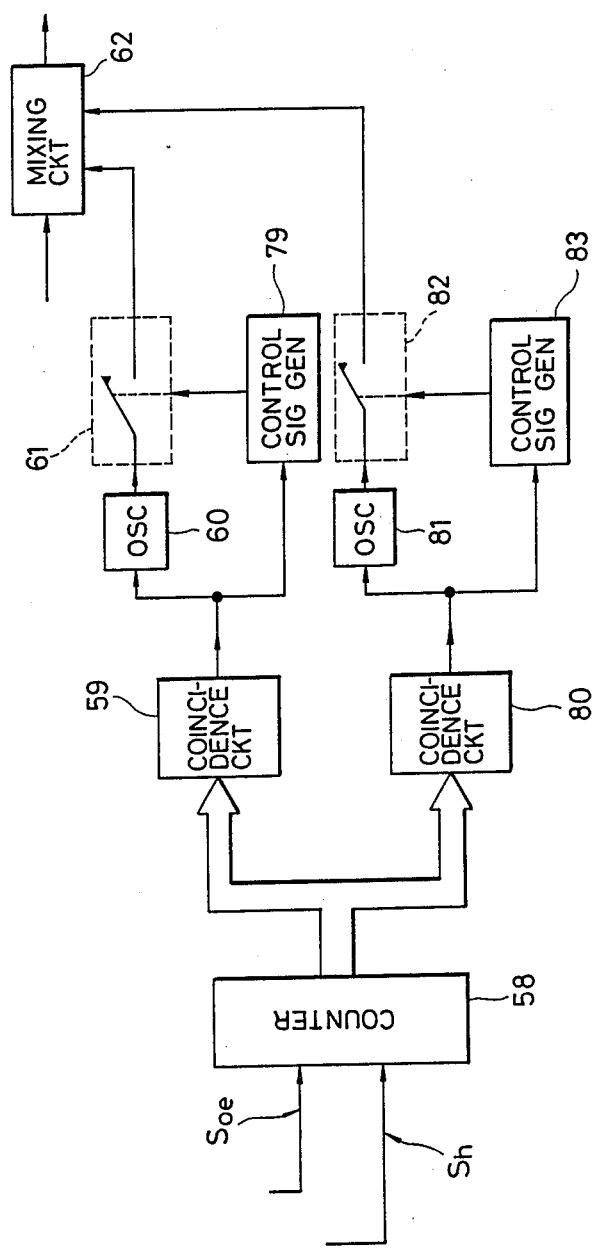
FIG. 12 is a block diagram showing a modification of a circuit portion for generating a field distinguishing signal used in the apparatus for recording/reproducing a composite video signal shown in FIG. 9.

In order to let the respective different field distinguishing signals correspond respective fields, i.e. odd field and even field constituting a signle frame, as described in the above, the count from the counter 58 of FIG. 9, which has already been described, is fed to the two coincidence circuits 59 and 80 as shown in FIG. 12, so that one coincidence circuit 80 outputs a coincidence pulse when the above-mentioned count of the counter 58 reaches a preset value 260, to supply the same to an oscillator 81 and an open/close control signal generator 83, while the other coincidence circuit 59 outputs a coincidence pulse when the above-mentioned count of the counter 58 reaches a preset value 523, to supply the same to an oscillator 60 and an open/close control signal generator 79. The above-mentioned two oscillators 81 and 60 are arranged to oscillate at different frequencies. The above-mentioned oscillators 81 and 60 respectively output burst signals having different frequencies from the instant of application of the above-mentioned coincidence pulse, and supply the same to the open/close circuits 82 and 61.

The open/close control signal generator 83 generates an open/close control signal which exists in a period between 260$^{th}$ and 261$^{st}$ horizontal sync signals from the time position of the leading edge of the vertical sync signal of an odd field, so as to control the open/close circuit 82, while the open/close control signal generator 79 generates an open/close control signal which exists in a period between 523$^{th}$ and 524$^{th}$ horizontal sync signals from the time position of the leading edge of the vertical sync signal of an odd field, so as to control the open/close circuit 61.

It is apparent that the output signal from the mixing circuit 62 assumes a state where respective different field distinguishing signals are added to odd field and even field constituting a single frame if the circuit configuration exemplified in FIG. 12.

When putting the apparatus for recording/reproducing a composite video signal into practice, the form of the recording tracks to be formed on the cylindrical recording medium may be arbitrarily selected.

While the timing of signal switching by the field switching circuit FS may be arbitrarily set within the vertical blanking period, it is desirable that the signal switching by the field switching circuit FS is performed within a period where equalizing pulses in the vertical blanking period exist. This is because, timing deviation would not affect the contents of the signal even if timing of signal switching is slightly deviated within the period where equalizing pulses exist if signal switching is performed by the field switching circuit FS within the period where equalizing pulses exist.

As is apparent from the above detailed description, the appartus for recording/reproducing a composite video signal according to the present invention improves the performance of the apparatus devised by the present inventors prior to the present invention, and removes drawbacks inherent to conventional recording/reproducing apparatus and the problem occurred in connection with the inventors' earlier apparatus. With the present invention, therefore, all the problems in the apparatus for recording/reproducing a composite video signal according to the conventional example and according to the inventors' earlier invention, are satisfactorily resolved and thus it is now possible to readily provide apparatus for recording/reproducing a composite video signal having superior performance.

The above-described embodiments are just examples of the present invention, and therefore, it will be apparent for those skilled in the art that many modifications and variations may be made without departing from the scope of the present invention.

What is claimed is:

1. In an apparatus for recording a composite video signal according to a standard television system with interlaced scanning on a rotary recording medium having at least one track and which is rotated at a rotational period equal to the period of vertical scanning of the composite video signal, the improvement comprising a circuit arrangement, including:

(a) first means responsive to horizontal and vertical sync signals of an input composite video signal to be recorded on said rotary recording medium for determining whether a present field is an odd field or an even field and for producing an output signal indicative of the detected field;

(b) second means responsive to said horizontal sync signal and to said output signal from said first means for producing a first control signal for a period of time corresponding to said odd or even field;

(c) third means for delaying, by a period equal to one half a horizontal scanning period, only the odd or even field signal of said input composite video signal in the presence of said first control signal from said second means, thereby producing a modified composite video signal to be recorded on said rotary recording medium, so that said horizontal sync signals are recorded to be aligned on said rotary recording medium in a width direction of said track and said vertical sync signals are also recorded thereon to be aligned substantially in a direction of the width of said track;

(d) a record circuit means responsive to said modified composite video signal for converting said modified composite video signal into a signal suitable for recording;

(e) fourth means responsive to said horizontal sync signal and to said output signal from said first means for producing a coincidence pulse;

(f) fifth means responsive to said coincidence pulse for producing a field distinguishing signal indicative of either odd field or even field; and (g) sixth means for mixing said field distinguishing signal with said signal from said record circuit means so that a superposed signal is fed to a record head.

2. A circuit arrangement as claimed in claim 1, further comprising:

(a) a reproduce circuit means responsive to a reproduced signal from a reproduce head for obtaining a reproduced modified composite video signal which is then fed to said third means;

(b) a detecting circuit means responsive to said reproduced signal from said reproduce head for detecting said field distinguishing signal;

(c) sixth means responsive to said detecting circuit means for producing a second control signal for a predetermined period of time sustantially corresponding to an even or odd field, said second control signal being fed to said third means in place of said first control signal in a reproduce mode where said reproduced modified composite video signal from said reproduce circuit means is fed to said third means in place of said input composite video signal so that the only even or odd field signal, which has not been delayed on recording, is delayed by one half the horizontal scanning period, thereby restoring said input composite video signal.

3. A circuit arrangement as claimed in claim 1, wherein said second means comprises:

(a) a first counter means responsive to a signal corresponding to said horizontal sync signal of said input composite video signal for producing an output signal when a count thereof reaches a first predetermined number;

(b) a second couter means responsive to the signal corresponding to said horizontal sync signal fed to said first counter means for producing an output signal when a count thereof reaches a second predetermined number which is close to a value twice said first predetermined number; and (c) a flip-flop responsive to said output signals from said first and second counter means so as to produce an output signal.

4. A circuit arrangement as claimed in claim 1, wherein said third means comprises:

(a) a delay circuit means for delaying an input signal by a period equal to one half the horizontal scanning period;

(b) a switching circuit means for alternately outputting an output signal from said delay circuit means and said input signal.

5. A circuit arrangement as claimed in claim 1, wherein said fourth means comprises:

(a) a counter means responsive to said horizonal sync signal for producing an output signal when a count thereof reaches a predetermined number;

(b) an oscillator means for producing a predetermined frequency signal; and (c) a switching means for transmitting the predetermined frequency signal from said oscillator means for a predetermined period of time.

6. A circuit arrangement as claimed in claim 2, wherein said detecting circuit means comprises:

(a) a band pass filter repsonsive to said reproduced signal from said reproduce head;

(b) a rectifier/filter responsive to an output signal from said band pass filter;

(c) an integrator resposive to an output signal from said rectifier/filter;

(d) a voltage comparator means for comparing an output voltage from said integrator with a predetermined threshold so as to produce an output signal; and (e) a waveform shaping circuit responsive to said output signal from said voltage comparator means.

7. A circuit arrangement as claimed in claim 2, wherein said sixth means comprises a monostable multivibrator means responsive to an output signal from said detecting circuit means for producing a signal for a predetermined period of time.

8. In an apparatus for recording and/or reproducing a composite video signal according to a standard television system with interlaced scanning on and/or from a rotary recording medium, the improvement comprising a circuit arrangement, including:

(a) first means responsive to horizontal and vertical sync signals of an input composite video signal to be recorded on said rotary recording medium for determining whether a present field is an odd field or an even field and for producing an output signal indicative of the detected field;

(b) second means responsive to said horizontal sync signal and to said output signal from said first means for producing a first control signal for a period of time corresponding to said odd or even field;

(c) third means for delaying, by a period equal to one half horizontal scanning period, only odd or even field signal of said input composite video signal in the presence of said first control signal from said second means, thereby producing a modified composite video signal to be recorded on said rotary recording medium;

(d) a record circuit means responsive to said modified composite video signal for converting said modified composite video signal into a signal suitable for recording;

(e) fourth means responsive to said horizontal sync signal and to said output signal from said first means for producing a field distinguishing signal indicative of either odd field or even field;

(f) fifth means for mixing said field distinguishing signal with said signal from said record circuit means so that a superposed signal is fed to a record head;

(g) a reproduce circuit means responsive to a reproduced signal from a reproduce head for obtaining a reproduced modified composite video signal which is then fed to said third means;

(h) a detecting circuit means responsive to said reproduced signal from said reproduce head for detecting said field distinguishing signal; and (i) sixth means responsive to said detecting circuit means for producing a second control signal for a predetermined period of time substantially corresponding to an even or odd field, said second control signal being fed to said third means in place of said first control signal in a reproduce mode where said reproduced modified composite video signal from said reproduce circuit means is fed to said third means in place of said input composite video signal so that only even or odd field signal, which has not been delayed on recording, is delayed by one half the horizontal scanning period, thereby restoring to said input composite video signal.

9. Apparatus for recording/reproducing a composite video signal according to a standard television system with interlaced scanning on and from a rotary recording medium, said apparatus comprising:

(a) rotary recording medium driving means for rotating the same at a speed equal to a vertical scanning period of said composite video signal;

(b) a head for recording/reproducing said composite video signal on and from said rotary recording medium;

(c) a head shifting mechanism for moving said head in synchronism with said vertical scanning period;

(d) first means responsive to horizontal and vertical sync signals of an input composite video signal to be recorded on said rotary recording medium for determining whether a present field is an odd field or an even field and for producing an output signal indicative of the detected field;

(e) second means resposnive to said horizontal sync signal and to said output signal from said first means for producing a first control signal for a period of time corresponding to said odd or even field;

(f) third means for delaying, by a period equal to one half a horizontal scanning period, only odd or even field signal of said input composite video signal in the presence of said first control signal from said second means, thereby producing a modified composite video signal to be recorded on said rotary recording medium;

(g) a record circuit means responsive to said modified composite video signal for converting said modified composite video signal into a signal suitable for recording;

(h) fourth means responsive to said horizontal sync signal and to said output signal from said first means for producing a field distinguishing signal indicative of either odd field or even field;

(i) fifth means for mixing said field distinguishing signal with said signal from said record circuit means so that a superposed signal is fed to said head;

(j) a reproduce circuit means responsive to a reproduced signal from said head for obtaining a reproduced modified composite video signal which is then fed to said third means;

(k) a detecting circuit means responsive to said reproduced signal from said reproduce head for detecting said field distinguishing signal; and (l) a sixth means responsive to said detecting circuit means for producing a second control signal for a predetermined period of time substantially corresponding to an even or odd field, said second control signal being fed to said third means in place of said first control signal in a reproduce mode where said reproduced modified composite video signal from said reproduce circuit means is fed to said third means in place of said input composite video signal so that only even or odd field signal, which has not been delayed on recording, is delayed by one half the horizontal scanning period, thereby restoring to said input composite video signal.

10. Apparatus for recording a composite video signal arranged to perform horizontal scanning and vertical scanning in accordance with an interlaced scanning standard, said apparatus recording said composite video signal on a rotary recording medium having at least one track, comprising:

(a) means for producing a recording signal having a signal form suitable for recording on the basis of a modified composite video signal arranged such that either an odd field signal or an even field signal of a composite video signal to be recorded is delayed by ½ of a horizontal synchronous period relative to the composite video signal of the other field;

(b) means responsive to said composite video signal for producing a field distinguishing signal by detecting whether a field is an odd or an even field; and (c) means for recording said recording signal produced on the basis of said modified composite video signal and said field distinguishing signal to be located at a given time position with respect to a predetermined vertical sync signal of each frame in said recording signal onto a rotary recording medium which is rotated at a rotating period equal to the period of vertical scanning of the composite video signal, so that horizontal sync signals are recorded to be aligned on said rotary recording medium in a direction of the width of said track and vertical sync signals are also recorded thereon to be aligned substantially in the width direction of said track.

11. Apparatus for recording a composite video signal as claimed in claim 10, wherein said field distinguishing signal is located at a time position spaced apart from a time position of a vertical sync signal belonging to a field which is not delayed with respect to the other field signal.

12. Apparatus for recording a composite video signal as claimed in claim 10, wherein a first field distinguishing signal is located at a predetermined time position spaced apart from the time position of a vertical sync signal belonging to a field which is not delayed with respect to the other field, and a second field distinguishing signal, which is different from said first distinguishing signal, is located at a predetermined time position spaced apart from the time position of a vertical sync signal belonging to a field which is delayed with respect to the other field.

13. Apparatus for recording/reproducing a composite video signal arranged to perform horizontal scanning and vertical scanning in accordance with an interlaced scanning standard, comprising:

(a) means for producing a recording signal having a signal form suitable for recording and reproducing on the basis of a modified composite video signal arranged such that either an odd field signal or an even field signal of a composite video signal to be recorded or reproduced is delayed by ½ of a horizontal sync period relative to the composite video signal of the other field;

(b) means responsive to said composite video signal for producing a field distinguishing signal by detecting whether a field is an odd or an even field;

(c) means for recording said recording signal produced on the basis of said modified composite video signal and said field distinguishing signal to be located at a given time position with respect to a predetermined vertical sync signal of each frame in said recording signal onto a rotary recording medium which is rotated at a rotating period equal to the period of vertical scanning of the compsite video signal;

(d) means for reproducing a reproducing signal corresponding to the recording signal produced on the basis of said modified composite video signal from said rotary recording medium and a reproducing signal corresponding to said field distinguishing signal;

(e) means for obtaining modified composite video signal and field distinguishing signal from said reproducing signal; and (f) means for obtaining the original composite video signal by retarding the field signal, which is not delayed, of the modified composite video signal using the field distinguishing signal by a period of ½ of the horizontal sync signal.

* * * * *